(12) United States Patent
Henry et al.

(10) Patent No.: US 10,679,765 B2
(45) Date of Patent: Jun. 9, 2020

(54) THERMOPLASTIC CARBON COMPOSITE ELECTRODES

(71) Applicant: Colorado State University Research Foundation, Fort Collins, CO (US)

(72) Inventors: Charles S. Henry, Fort Collins, CO (US); Kevin Klunder, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 16/533,259

(22) Filed: Aug. 6, 2019

(65) Prior Publication Data

US 2019/0362867 A1 Nov. 28, 2019

Related U.S. Application Data

(63) Continuation of application No. PCT/US2018/017094, filed on Feb. 6, 2018.

(60) Provisional application No. 62/455,748, filed on Feb. 7, 2017.

(51) Int. Cl.
*B32B 7/02* (2019.01)
*H01B 1/24* (2006.01)
*H01B 13/00* (2006.01)

(52) U.S. Cl.
CPC .......... *H01B 1/24* (2013.01); *H01B 13/0036* (2013.01)

(58) Field of Classification Search
CPC ........ B32B 7/02; B32B 5/22; H01L 21/02527
See application file for complete search history.

(56) References Cited

U.S. PATENT DOCUMENTS

| | | | |
|---|---|---|---|
| 6,620,342 B1 | 9/2003 | Burchill et al. | |
| 6,793,967 B1 | 9/2004 | Ata et al. | |
| 6,808,845 B1 | 10/2004 | Nonaka et al. | |
| 9,187,332 B2 | 11/2015 | Yoon et al. | |
| 2005/0036020 A1 | 2/2005 | Li et al. | |
| 2007/0215841 A1 | 9/2007 | Ford et al. | |
| 2010/0187482 A1 | 7/2010 | Mullen et al. | |
| 2011/0102002 A1 | 5/2011 | Riehl et al. | |
| 2013/0272951 A1* | 10/2013 | Hiura ................. | H01L 21/0237 423/448 |

FOREIGN PATENT DOCUMENTS

| | | |
|---|---|---|
| WO | 2010092977 A1 | 8/2010 |
| WO | 2016154194 A1 | 9/2016 |

OTHER PUBLICATIONS

Becker et al., "Polymer Microfluidic Devices," Talanta, 56(2):267-287, Feb 2002.
McCreery, R.L., "Advanced Carbon Electrode Materials for Molecular Electrochemistry," Chem Rev., 108(7):2646-2687, Jul. 2008.
Regel wt al., "Integration of a Graphite/PMMA Composite Electrode into a Poly(methyl methacrylate) (PMMA) Substrate for Electrochemical Detection in Microchips," Electrophoresis, 34(14):2101-6, Jul. 2013.
Yao et al., "Carbon Nanotube/Poly(methyl methacrylate) (CNT/PMMA) Composite Electrode Fabricated by In Situ Polymerization for Microchip Capillary Electrophoresis," Chemistry, 13(3):846-53, Jan. 2007.
Yao et al., "Carbon Nanotubelpoly(methyl methacrylate) Composite Electrode for Capillary Electrophoretic Measurement of Honokiol and Magnolol in Cortex Magnoliae Officinalis," Electrophoresis, 27(16):3233-3242, Aug. 2006.
Zheng et al., "Fabrication and Electrochemistry of Graphite/poly(methylmethacrylate) Composite Electrode for o-sec-butylphenol Determination," Electrochimica Acta, 88:117-122, Jan. 2013.

* cited by examiner

*Primary Examiner* — Lawrence D Ferguson
(74) *Attorney, Agent, or Firm* — Haukaas Fortius PLLC; Michael H. Haukaas

(57) ABSTRACT

A new solvent-based method is presented for making low-cost composite graphite electrodes containing a thermoplastic binder. The electrodes, termed thermoplastic electrodes (TPEs), are easy to fabricate and pattern, give excellent electrochemical performance, and have high conductivity (1500 S m$^{-1}$). The thermoplastic binder enables the electrodes to be hot embossed, molded, templated, and/or cut with a $CO_2$ laser into a variety of intricate patterns. These electrodes show a marked improvement in peak current, peak separation, and resistance to charge transfer over traditional carbon electrodes. The impact of electrode composition, surface treatment (sanding, polishing, plasma treatment), and graphite source were found to impact fabrication, patterning, conductivity, and electrochemical performance. Under optimized conditions, electrodes generated responses similar to more expensive and difficult to fabricate graphene and highly oriented pyrolytic graphite electrodes. These TPE electrodes provide an approach for fabricating high-performance carbon electrodes with applications ranging from sensing to batteries.

7 Claims, 17 Drawing Sheets

THERMOPLASTIC CARBON COMPOSITE ELECTRODES

RELATED APPLICATIONS

This application is a continuation application, filed under 35 U.S.C. § 111(a), of International Application No. PCT/US2018/017094 filed Feb. 6, 2018, which claims priority under 35 U.S.C. § 119(e) to U.S. Provisional Patent Application No. 62/455,748 filed Feb. 7, 2017, which applications are incorporated herein by reference.

GOVERNMENT SUPPORT

This invention was made with government support under grant 1710222 awarded by National Science Foundation and grant R01 OH010662 awarded by Center for Disease Control. The government has certain rights in the invention.

BACKGROUND OF THE INVENTION

Solid state, and quasi solid state, carbon composite electrodes have been known and implemented as far back as 57 years ago. The initial work often utilized a wax material, epoxy, or plastics like poly(methylmethacrylate), Teflon, polyethylene. Some of the advantages of working with a solid state composite electrode are a sandable surface, which can be repeatedly regenerated, acid or base compatibility, tunable solvent compatibility, facile catalyst incorporation, a chemically tunable substrate, geometrical electrode patterning, and a low cost and disposable platform.

Current commercial disposable electrodes are typically produced with automatic screen printers and are simply referred to as screen printed electrodes (SPEs). An automatic screen printer cost >10,000 dollars and requires a skilled operator. The resulting SPE are typically incompatible with popular organic solvents used in electrochemistry. SPEs generally have a lower electrochemical activity and have high cell resistances of 100's of Ohms. In a sensor, low activity of SPE can cause problems with multiple analyte detection (poor resolution), as well as detection limits. Higher cell resistances make SPEs a poor choice for kinetic measurements, limiting their use in fundamental electrochemical research. Studying electrochemical kinetics is critical in understanding the underlying mechanisms/chemistry in the fundamental research of sensors, as well as electrochemical energy storage and/or generation. Lastly, SPE are typically crudely coupled with complex electrochemical systems such as microfluidics because they are not directly integrated into the microfluidic substrate. Arduous integration of SPE into complicated electrochemical systems hinders the development of carbon electrode integration into the so called "lab on a chip", a revolutionizing analytical sensing technology.

Initial attempts with PMMA and graphitic composite carbon electrodes utilized an elaborate radiation-based method to fabricate electrochemical electrodes. Later, a spray coating technique was developed involving PMMA and graphite dissolved in butyl acetate to fabricate electrodes for measuring cadmium ions. More recently, Yao and coworkers developed an in-situ polymerization technique for making composite carbon nanotube PMMA electrochemical devices. The process was also adopted by Dia and Zheng from the Guonon Chen laboratory which implements graphitic carbon with PMMA. Additionally, an impregnation technique was proposed to fabricate PMMA:Graphitic electrodes coupled with electrophoresis.

Composite carbon electrodes have been employed in a wide variety of applications, ranging from batteries and fuel cells to chemical sensors, because they are easy to make and pattern at millimeter scales. Despite their widespread use, traditional carbon composite electrodes have substandard electrochemistry relative to metallic and glassy carbon electrodes. As a result, there is a critical need for new composite carbon electrodes that are highly electrochemically active, have universal and easy fabrication into complex geometries, are highly conductive, and are low cost.

SUMMARY

Although carbon composite electrodes are known, there remains a need for electrodes that are inexpensive, easy to make, easily customizable, chemically modifiable, with low electrical resistance and high activity. The electrodes of this disclosure meet these criteria and have widespread application in electrochemical devices, including sensors, batteries, supercapacitors, microbial fuel cells, redox flow batteries, gas sensors, and disposable one-use generic electrodes. For example, the electrodes may be used as point of care health monitoring sensors, or used for the detection of toxic metals such as Pd, Cd, As.

Accordingly, this disclosure provides a thermoplastic electrode comprising:
  a) a thermoplastic composite having a uniform dispersion of a poly(methyl methacrylate) binder, and a carbon allotrope that has a particle diameter of about 0.1 µm to about 300 µm, wherein a mass ratio of binder:allotrope is about 1:0.5 to about 1:6, and wherein the thermoplastic composite has surface roughness of less than 5 µm; and
  b) a substrate comprising an electrical conductor that is in electrical contact with the thermoplastic composite;
wherein the carbon allotrope is at least partially exposed at an active surface of the thermoplastic electrode, and the thermoplastic electrode has a conductivity of about 10-fold to about 1000-fold higher than a screen-printed carbon electrode.

Additionally, this disclosure provides a method of preparing a thermoplastic electrode comprising:
  a) dissolving a thermoplastic binder in a solvent to form a solution;
  b) combining a carbon allotrope and the solution to form a thermoplastic mixture;
  c) at least partially drying the thermoplastic mixture to form a thermoplastic composite;
  d) shaping the thermoplastic composite; and
  e) etching the thermoplastic binder at the surface of thermoplastic composite, thereby at least partially exposing the carbon allotrope;
wherein the thermoplastic composite is in electrical contact with an electrical conductor to form a thermoplastic electrode having an active surface and a surface roughness of about 0.1 µm to about 5 µm.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1A:
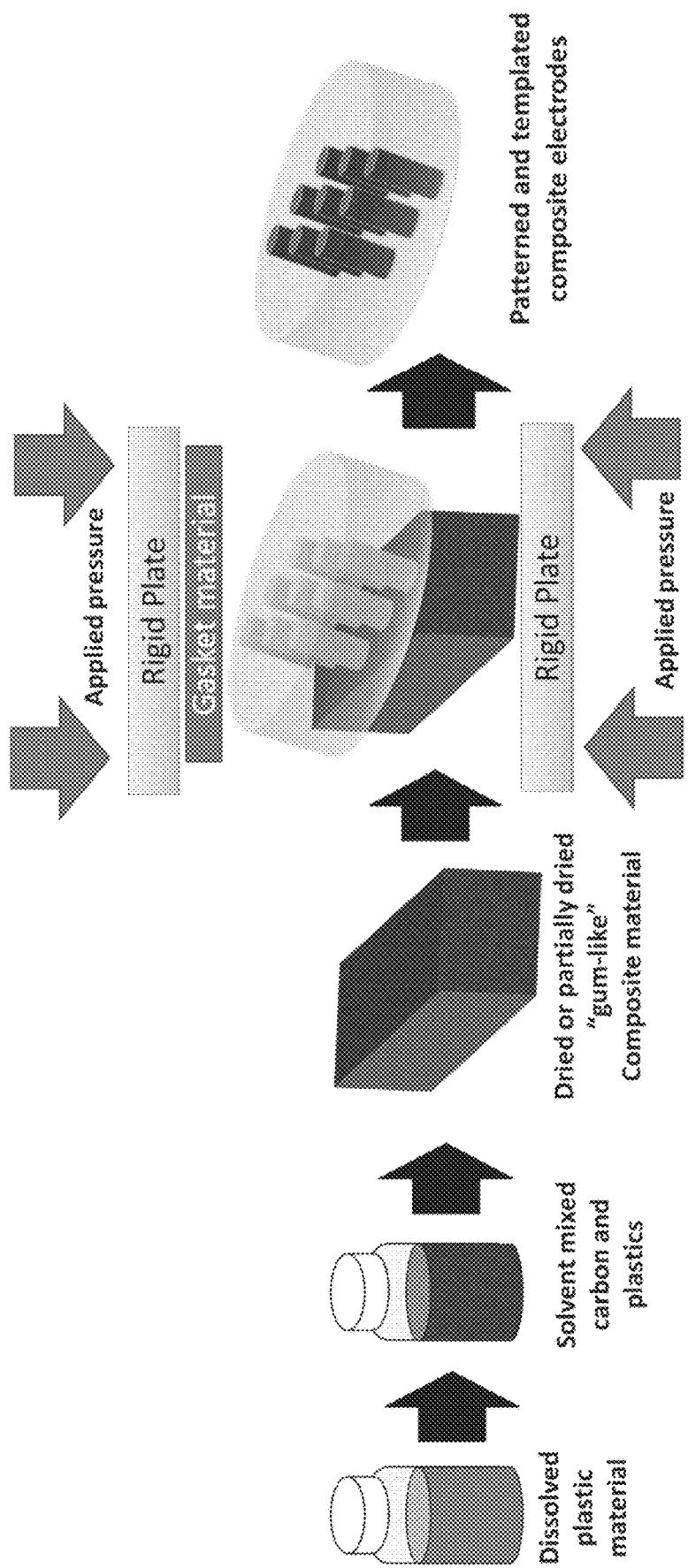
FIG. 1A-1D. (A) General fabrication method for making templated TPEs. (B) 1:2, 11 μm TPE with 14 individually addressable 150 μm wide bands, and an array of 150 μm diameter individually addressable TPEs. (C) Laser-cut TPE letters, which were hot pressed into a premade matching template. (D1) Serpentine microchannel SU-8 template (top) and the negative embossed image into a 1:0.3, ≤500 nm TPE. (D2) channels embossed in a 1:2, 11 μm TPE. (D3) Hot embossed pillar array using a 1:0.3, ≤500 nm TPE.

Disposable composite carbon electrodes have applications in a variety of societal needs. The applications include, drug testing/monitoring (2.5 billion by 2021), immunoassays for virus and bacteria detection (16 billion by 2021), health monitoring including wearable sensors (241 billion by 2020), environmental (pollution and others) sensing and monitoring (24 billion by 2021). While carbon electrodes are popular in these applications, low cost carbon electrodes have limitations. Currently, most of inexpensive carbon electrodes have a low electrochemical activity, are incompatible with organic solvents and/or are hard to pattern into complex geometries. Herein is disclosed a recently developed and novel composite carbon electrode that is inexpensive and easy to pattern, with exceedingly high electrochemical performance. This new process provides a simpler fabrication process that is amenable to mass production at commercial scales.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the endpoints of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%. For example, repeat unit A is substantially soluble (e.g., greater than about 95% or greater than about 99%) in a polar organic solvent and is substantially insoluble (e.g., less than about 5% or less than about 1%) in a fluorocarbon solvent. In another example, repeat unit B is substantially soluble (e.g., greater than about 95% or greater than about 99%) in a fluorocarbon solvent and is substantially insoluble (e.g., less than about 5% or less than about 1%) in a polar organic solvent.

A "solvent" as described herein can include water or an organic solvent. Examples of organic solvents include, but are not limited to, hydrocarbons such as toluene, xylene, hexane, and heptane; chlorinated solvents such as methylene chloride, chloroform, and dichloroethane; ethers such as diethyl ether, tetrahydrofuran, and dibutyl ether; ketones such as acetone and 2-butanone; esters such as ethyl acetate and butyl acetate; nitriles such as acetonitrile; alcohols such as methanol, ethanol, and tert-butanol; and aprotic polar solvents such as N,N-dimethylformamide (DMF), N,N-dimethylacetamide (DMA), and dimethyl sulfoxide (DMSO). Solvents may be used alone or two or more of them may be mixed for use to provide a "solvent system".

Further examples of useful organic solvents include any organic solvent in which the starting materials and reagents are sufficiently soluble to provide reaction products.

Examples of such organic solvents may include ketones such as cyclohexanone and methyl amyl ketone; alcohols such as 3-methoxybutanol, 3-methyl-3-methoxybutanol, 1-methoxy-2-propanol, and 1-ethoxy-2-propanol; ethers such as propylenegylcol monomethyl ether, ethylenegylcol monomethyl ether, propylenegylcol monoethyl ether, ethylenegylcol monoethyl ether, propylenegylcol dimethyl ether, and diethylenegylcol dimethyl ether; esters such as propylenegylcol monomethyl ether acetate, propylenegylcol monoethyl ether acetate, ethyl lactate, ethyl pyruvate, butyl acetate, methyl 3-methoxypropionate, ethyl 3-ethoxypropionate, tert-butyl acetate, tert-butyl propionate, and propylenegylcol mono-tert-butyl ether acetate; and lactones such as γ-butyrolactone. These organic solvents may be used alone or in a mixture of two or more kinds thereof, but are not limited thereto.

The term "functional group" refers to specific groups (moieties) of atoms or bonds within molecules (for example, organic chemical compounds and polymers) that are responsible, for example, for the characteristic chemical reactions of those molecules (or interactions with other molecules or ions). The same functional group can undergo the same or similar chemical reaction(s) regardless of the size of the molecule it is a part of. However, its relative reactivity can be modified by other functional groups nearby. The atoms of functional groups are linked to each other and to the rest of the molecule by covalent bonds. Functional groups can also be charged, e.g. in carboxylate salts (—COO—), or ammonium salts which turns the molecule into a polyatomic ion or a complex ion. Functional groups binding to a central atom in a coordination complex are called ligands, but they can also interact with ions to form chemical gradients. The functional group can be tethered to a polymer, such as a group of atoms comprising, for example, carbon, nitrogen, oxygen that are covalently bonded together. The group of atoms may have additional substituents that also comprise, for example, carbon, nitrogen, oxygen, but can also include other atoms that are known in the field of organic chemistry, organometallic chemistry, polymer chemistry, analytical chemistry, and electrochemistry.

The term "lower alkyl" refers to a branched or unbranched hydrocarbon having, for example, from 1-20 carbon atoms, and often 1-12, 1-10, 1-8, 1-6, or preferably 1-4 carbon atoms. As used herein, the term "alkyl" also encompasses a "cycloalkyl", defined below. Examples include, but are not limited to, methyl, ethyl, propyl, butyl, pentyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like.

The term "surface roughness" refers to a component of surface texture. It is quantified by the deviations in the direction of the normal vector of a real surface from its ideal form. If these deviations are large, the surface is rough; if they are small, the surface is smooth. In surface metrology, roughness is typically considered to be the high-frequency, short-wavelength component of a measured surface. The amplitude and frequency can be determined to ensure that a surface is fit for a purpose.

The term "gasket" as disclosed herein refers to a mechanical seal which fills the space between two or more mating surfaces, generally to smooth-out irregularities from the joined objects while under compression. Gaskets allow for "less-than-perfect" mating surfaces on machine parts where they can fill irregularities and reduce the number of open pores. For example, a gasket having a flat, smooth surface that is in contact with the surface of a polymer gel, when under pressure during molding, will create a smoother surface on the surface of the polymer gel than the surface formed on the polymer gel that is molded without a gasket. The gasket also provides an evenly applied pressure that can be sustained and prolonged at the surface of the thermoplastic composite, as the soft, gum-like electrode material is hardening via heating or solvent evaporation.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2, 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described elsewhere in this disclosure.

Embodiments of the Invention

This disclosure describes various embodiments of a thermoplastic electrode comprising:
a) a thermoplastic composite having a uniform dispersion of a poly(methyl methacrylate) binder, and a carbon allotrope that has a particle diameter of about 0.1 μm to about 300 μm, wherein a mass ratio of binder:allotrope is about 1:0.5 to about 1:6, and wherein the thermoplastic composite has surface roughness of less than 5 μm; and
b) a substrate comprising an electrical conductor that is in electrical contact with the thermoplastic composite;
wherein the carbon allotrope is at least partially exposed at an active surface of the thermoplastic electrode, and the thermoplastic electrode has a conductivity of about 10-fold to about 1000-fold higher than a screen-printed carbon electrode.

In some embodiments, the thermoplastic electrode has a conductivity of about 5-fold to about 2000-fold higher than a screen-printed carbon electrode, about 20-fold to about 50-fold higher, about 20-fold to about 200-fold higher, about 20-fold to about 300-fold higher, about 20-fold to about 400-fold higher, about 20-fold to about 500-fold higher, about 20-fold to about 1000-fold higher, about 20-fold to about 1500-fold higher, or about 100-fold to about 500-fold higher. In some preferred embodiments, the carbon allotrope comprises graphite.

In other embodiments, the graphite has a particle size of about 0.5 μm to about 30 μm, about 0.1 μm to about 50 μm, about 0.1 μm to about 100 μm, about 0.1 μm to about 200 μm, about 0.1 pin to about 30 μm, about 0.1 pin to about 20 μm, about 0.5 pin to about 15 μm, about 0.1 μm to about 10 μm, or about 0.5 μm to about 20 μm.

In various embodiments the mass ratio of binder:allotrope is about 1:0.5 to about 1:8, about 1:0.5 to about 1:5, about 1:0.5 to about 1:4, or about 1:0.5 to about 1:4, In other embodiments, the mass ratio of binder:graphite is about 1:2 to about 1:3, about 1:1 to about 1:4, or about 1:2 to about 1:4. In yet other embodiments, the conductivity is about 100 S m$^{-1}$ to about 5000 S m$^{-1}$, about 100 S m$^{-1}$ to about 4000 S m$^{-1}$, about 100 S m$^{-1}$ to about 3000 S m$^{-1}$, about 100 S m$^{-1}$ to about 2500 S m$^{-1}$, about 100 S m$^{-1}$ to about 2000 S m$^{-1}$, about 100 S m$^{-1}$ to about 1500 S m$^{-1}$, about 100 S m$^{-1}$ to about 1000 S m$^{-1}$, about 100 S m$^{-1}$ to about 750 S m$^{-1}$, about 100 S m$^{-1}$ to about 500 S m$^{-1}$, about 1000 S m$^{-1}$ to about 2000 S m$^{-1}$, or about 50 S m$^{-1}$ to about 500 S m$^{-1}$. In additional embodiments, the surface roughness is about 0.1 µm to about 2 µm, about 0.01 µm to about 5 µm, about 0.01 µm to about 2 µm, about 0.01 µm to about 1 µm, about 0.1 µm to about 1 µm, about 0.1 µm to about 3 µm, about 0.1 µm to about 4 µm, or about 1 µm to about 2 µm.

This disclosure also provides a method of preparing a thermoplastic electrode comprising:
a) dissolving a thermoplastic binder in a solvent to form a solution;
b) combining a carbon allotrope and the solution to form a thermoplastic mixture;
c) at least partially drying the thermoplastic mixture to form a thermoplastic composite;
d) shaping the thermoplastic composite; and
e) etching the thermoplastic binder at the surface of thermoplastic composite, thereby at least partially exposing the carbon allotrope;
wherein the thermoplastic composite is in electrical contact with an electrical conductor to form a thermoplastic electrode having an active surface and a surface roughness of about 0.1 µm to about 5 µm.

In some embodiments the drying is performed before applying the thermoplastic composite to a substrate. Drying can also be performed after applying the thermoplastic composite to a substrate, and also while shaping the thermoplastic composite into the substrate. In some embodiments, drying of the thermoplastic mixture or thermoplastic composite is performed by evaporation, under reduced pressure, at a vacuum, at room temperature (e.g., about 20° C. to about 25° C.), above room temperature, less than 100° C., more than 100° C., at about 0° C. to about 300° C., or at about 10° C. to about 200° C. Drying can also be performed while the thermoplastic mixture or composite is under pressure, for example, at atmospheric pressure or above 1 atm, or about 1 atm to about 1000 atm.

In various embodiments of the disclosed apparatus and methods, the thermoplastic binder comprises a polymer, poly(methyl methacrylate), poly-caprolactone, polyethylene, polycarbonate, polylactic acid, polyamide, polyimide, Acrylonitrile butadiene styrene, polybenzimidazole, polypropylene, polystyrene, polyvinyl chloride, polyphenylene sulfide, polyphenylene oxide, polyether sulfone, polyoxymethylene, polyetherether ketone, polyetherimide, polyurethanes, polyolefin, or a combination thereof. In some embodiments, the polymer comprises about 25 to 10$^6$ repeating units (e.g., the monomer or block co-polymer moiety defining the repeating unit). In some embodiments, the number of repeat units is about 10$^3$ to about 10$^{10}$, or about 10$^4$ to about 10$^8$.

In various other embodiments of the disclosed apparatus and methods, the carbon allotrope comprises graphite, expanded graphite, graphite oxide, graphene, boron doped diamond, graphene oxide, glassy carbon, vitreous carbon, carbon nanotubes, carbon black, fullerenes, or a combination thereof. In some embodiments, the said carbon allotropes are functionalized as described above. Preferably, functionalization comprises amino, hydroxy, oxo, alkoxy, or halide functionalized allotropes, or the allotropes comprise doped carbon materials, such as doping with sulfur, nitrogen, or other elements or diatomic molecules.

In additional embodiments, the carbon allotrope comprises graphite, and the graphite has a particle diameter of about 0.1 µm to about 300 µm. In other embodiments, a mass ratio of binder:graphite is about 1:0.5 to about 1:6.

In yet additional embodiments, the thermoplastic composite is viscous, or has gum-like consistency. The viscosity or gum-like consistency can be dependent on an additive, such as, but is not limited to solvents. The amount of solvents by weight compared to the mass of the polymer and carbon allotrope that achieves a viscous or a gum-like consistency can range from about 0.1% solvent to about 50% solvent. In other embodiments the solvent by weight is about 1% to about 40%, about 2% to about 40%, about 3% to about 40%, about 5% to about 40%, about 5% to about 40%, about 5% to about 30%, about 5% to about 20%, about 1% to about 20%, about 5% to about 25%, or about 1% to about 10%.

In additional embodiments, shaping comprises molding, cutting, embossing, or a combination thereof. In yet other embodiments, shaping is performed at about the glass transition temperature (Tg) of the thermoplastic composite, about less than 20° C. below Tg, or about less than 20° C. above Tg. For example, in some embodiments, the dried (e.g., less than about 5% solvent) thermoplastic composite is shaped at a temperature about 20° C. above Tg. In some embodiments, shaping or molding the thermoplastic composite using a substrate, such as a template or mold, is performed at a temperature of about 1° C. to about 30° C. above the melting temperature or glass transition of the polymer or thermoplastic binder that is used.

In various other embodiments, the shaping comprises applying pressure to a gum-like thermoplastic composite, wherein a gasket is between a surface of the thermoplastic composite and a surface applying the pressure. In yet other embodiments, a template (a form, a dye, a mold) and a partially dried thermoplastic composite (e.g., a gum) is held between a gasket and two rigid plates that apply pressure while the composite material hardens. The gasket that is pressed to the surface of the thermoplastic composite, as it hardens, is critical to the formation of the electrode surface that imparts the unexpected properties described herein (e.g., high conductivity and Nernstian character). The surface of the electrode is smoother and less porous as a result of the gasket as compared to an electrode that is formed without using the gasket (vide infra).

In some embodiments, the pressure applied is about 10 psi to about 5000 psi, about 10 psi to about 2000 psi, about 15 psi to about 1000 psi, about 15 psi to about 500 psi, about 20 psi to about 500 psi, about 20 psi to about 200 psi, about 15 psi to about 100 psi, about 10 psi to about 100 psi, or about 1000 psi to about 3000 psi. In other embodiments the gasket is a soft deformable polymer such as an elastomer, or a polymer with a smooth surface, or a polymer with an essentially flawless surface. In yet other embodiments, heat is applied before shaping, during shaping, after shaping, or a combination thereof.

In yet other embodiments, shaping comprises patterning, wherein the size of the pattern formed is about 0.1 µm to about 500 µm, about 0.1 µm to about 400 µm, about 0.1 µm to about 300 µm, about 0.1 µm to about 200 µm, about 1 µm to about 250 µm, about 10 µm to about 200 µm, about 50 µm to about 200 µm, about 25 µm to about 150 µm, or less than about 200 µm. The term "size" can refer to length, width, height, depth, diameter, or radius.

In additional embodiments, the solvent comprises lower alkyl halogenated alkanes, lower alkyl ketones, lower alkyl ethers, lower alkyl esters, lower alkyl alcohols, lower alkyl amides, lower alkyl sulfoxides, or a combination thereof. In yet other embodiments, etching (grinding, carving, dissolving, cutting, etc.) is performed by sanding, polishing, plasma exposure, sonication, electrochemical conditioning, solvent wiping of the electrode surface, or a combination thereof.

In various embodiments of the disclosed electrode and methods, the thermoplastic electrode is characterized (via electrochemistry) by a peak separation that is approximately Nernstian (i.e., about 50 mV to about 70 mV, or about 60 mV), or the thermoplastic electrode is characterized by a kinetic charge transfer value of about 0.1 ohm cm$^2$ to about 4 ohm cm$^2$.

In additional embodiments, the thermoplastic electrode has a conductivity of about 10-fold to about 1000-fold higher than a screen-printed carbon electrode, or the thermoplastic electrode has a conductivity of about 100 S m$^{-1}$ to about 2500 S m$^{-1}$. In some embodiments, the thermoplastic composite comprises a catalyst. In other embodiments, the catalyst is organometallic. In yet other embodiments the thermoplastic composite has negligible porosity. On some embodiments the thermoplastic composite has no porosity, or less than about 1 to about 1000 (or 10 to 100) detectable (e.g., by microscopy) pores per m$^2$, cm$^2$, mm$^2$, μm$^2$, or nm$^2$.

In various embodiments, the disclosed method comprises shaping with a substrate (or template) that has a pattern. In other embodiments, shaping the thermoplastic composite (or gum) comprises a substrate that has a 2-dimensional pattern, a 3-dimensional pattern, or a combination thereof. In yet other embodiments, the thermoplastic composite is added to a substrate that is patterned in 2- and/or 3-dimensions, wherein the formed electrode sizes range from about 100 nm to about 1 meter. In other embodiments, the dimensions (e.g., a size such as the diameter) of the electrode can be about 1 nm to about 1 mm, about 10 nm to about 1 μm, about 1 mm to about 100 cm, about 0.1 m to about 0.5 m, about 0.1 m to about 1 m, or about 1 m to about 10 m.

Various additional embodiments of the disclosure provide carbon electrodes that are reusable electrodes capable of being regenerated for up to 100's to 1000's of uses, such as for sensing, detecting, or measuring. In other embodiments, precisely defined electrode geometries can be formed by methods that require no masking of the electrode surface. In some embodiments the electrodes have micron electrode features. In yet other embodiments, an electrode surface is well integrated into the substrate and generates a smooth surface of <1 micron roughness. In some other embodiments, the electrodes can be patterned on both sides, enabling an easy electrical connection, defined electrode geometries, or a combination thereof.

In yet other embodiments, the electrodes give a kinetic charge transfer value of <1 ohm cm$^2$. In comparison, glassy carbon, commonly used as a carbon standard, has a kinetic charge transfer value of 5 ohm cm$^2$, and the screen printed commercial electrode has a kinetic charge transfer value of 35 ohm cm$^2$. Thus, the disclosed electrodes perform better for electron transfer kinetic measurements than said known electrodes because, as resistance to charge transfer goes up the kinetics of electron transfer are diminished.

In one aspect of the invention, a carbon allotrope is mixed with a thermoplastic. In one aspect of the invention, a carbon:plastic ratio of 1:1 or higher (2:1, 3:1, 4:1, 5:1, 6:1, etc.) is used. In one aspect of the invention, a solvent is used as the mixing agent. In one aspect of the invention, hot pressing is performed on the deposited carbon/plastic mixture.

In one aspect of the invention, the deposited electrode material is heated near or above the $T_g$ of the thermoplastic and molded into complex shapes, channels, or patterns, including pillar arrays, interdigitated, or 3-dimensional electrodes. The temperature to mold the thermoplastic composite material can depend on the plastic's intrinsic thermal properties, and/or the presence of solvent within the composite, or some combination thereof.

In one aspect of the invention, the material is sanded and/or polished prior to use. In other aspects of the invention, the material is treated with plasma cleaning, sonication, solvent wiping, electrochemical conditioning, or other technique.

In one aspect of the invention, the material is modified with a chemical catalyst. In another aspect of the invention, the catalyst is a substituted or unsubstituted metal porphyrin (including but not limited to substituted and unsubstituted phthalocyanines) wherein the metal can be any metal capable of porphyrin ligation, such as copper, nickel and cobalt. In another aspect, the porphyrin is polymeric. In another aspect, the porphyrin is not ligated to a metal.

The catalyst may be composed of, but not limited to, metals, metal oxides, alloys, enzymes, organic molecules, and metal coordination complexes. The catalyst can be chemically attached to either the plastic or the graphite, simply mixed into the matrix, or physisorbed or chemisorbed onto the carbon polymer composite.

In one aspect of the invention, a high boiling point solvent capable of thoroughly dissolving the plastic is used as the mixing agent. In another aspect of the invention, a high boiling point solvent is used as the mixing agent to control the evaporation rate. In another aspect of the invention, two or more high boiling point solvents that are miscible are used. In yet another aspect of the invention, one or more high boiling point solvents may be mixed with one or more lower boiling point solvents.

In one aspect of the invention, the mixing agent is any organic solvent capable of thoroughly dissolving the plastic or polymer. In another aspect of the invention, the mixing agent is selected from dichloroethane, butylacetate, ethylacetate, (other alkyl acetates), tetrahydrofuran (THF), ethanol, alkyl alcohols, dichloromethane, chloroform, propylene carbonate, dimethyl formamide, dimethyl sulfoxide, toluene, and acetone. In yet another aspect of the invention, a combination of two or more solvents that are miscible may be used.

In one aspect of the invention, the plastic is a dissolvable plastic such as poly(methyl methacrylate), polyethylene, polycarbonate, cyclic olefin polymer, etc. In one aspect of the invention, the carbon allotrope is selected from carbon nanotubes, graphene (and oxides), graphite, carbon fiber, carbon black, fullerenes, etc.

In one aspect of the invention, the solvent/carbon/plastic mixture is printed with an inkjet, or 3D printed with extrusion, or treated like a thermoplastic and molded and embossed. In other aspects of the invention, the liquid mixture is sprayed onto surfaces, applied with doctor blade, or screen printed. In one aspect of the invention, the deposited material is an electrode.

Patternable Solvent-Processed Thermoplastic Graphite Electrodes

Carbon electrodes have been widely used because of their favorable electroactivity, biocompatibility, chemical stability, high conductivity, wide potential window, and low cost.

Common carbon electrodes include glassy carbon, screen printed carbon (SPE), carbon paste (CPE), boron-doped diamond (BDD), carbon black, pyrolytic graphite, carbon nanotubes, and graphene. The breadth of applications of carbon-based electrodes is diverse and includes batteries, fuel cells, wastewater treatment, supercapacitors, anti-static applications, and chemical sensors. One challenge with carbon electrodes, however, is the trade-off between ease of fabrication and electrochemical performance. Composite electrodes (CEs) are made from carbon particles held together with a binder and are among the easiest carbon electrodes to make and pattern into millimeter-sized electrodes. Smaller and more complicated CEs are difficult to make. To assemble carbon CEs, a broad range of binders including wax, ionic liquids, epoxy, and plastics such as poly(methyl methacrylate) (PMMA), Teflon, and polyethylene have been used. While carbon CEs are easy to fabricate, they generally suffer from low conductivity and slow electron transfer kinetics. As a result, there remains significant interest in developing CEs that are inexpensive and easy to fabricate but also highly conductive and possess high electrochemical performance.

Among binder materials, PMMA has been largely ignored, and only a handful of reports exist on its use as a binding medium. The lack of use of PMMA as a binder is odd considering its low cost, ready availability, solubility in a variety of solvents, and popular use in analytical devices. Methacrylate thermoplastic CEs are known but have largely relied on either complex fabrication methods or methods that limit patterning. Also, an in situ polymerization method for making PMMA:carbon nanotube electrochemical devices was developed, as well as an impregnation technique to fabricate PMMA:graphite electrodes. While these reports provide a basis for the current studies, it is generally unclear how CEs processing change to parameters such as surface treatment, particle size, carbon source, and binder:carbon composition can be used to improve electrode fabrication, patterning, conductivity, and electrochemical performance.

Here, a new solvent-assisted fabrication technique for generating electrodes, referred to as thermoplastic electrodes (TPEs), is reported. TPEs can be patterned via template printing, embossing, and laser cutting into a variety of complex geometries, including flow channel and pillar arrays with micrometer-sized features. Electrode conductivities 10- to 100-fold higher than those of traditional screen-printed carbon electrodes can be achieved by varying the PMMA:carbon ratio, with 11 μm graphite particles giving conductivity as high as about 700 S m$^{-1}$ to about 1500 S m$^{-1}$. Following conductivity measurements, electrochemical characterization using cyclic voltammetry and electrochemical impedance spectroscopy in comparison to glassy carbon, screen-printed carbon, and Pt electrodes was carried out using ferricyanide as the redox probe. The TPE outperformed both commercial carbon electrodes and performed similarly to the Pt electrode. A variety of inner- and outer-sphere redox probes designed to test different electron-transfer processes were then evaluated. Surface treatments, including polishing, sanding, and plasma exposure, provide the ability to tune the reactivity, activating and deactivating the electrode for certain chemical systems. Remarkably, with surface treatments, the TPE demonstrates electrochemistry toward the highly surface sensitive redox probes of dopamine and ascorbic acid comparable to that of the more difficult to prepare electrode materials of graphene, carbon nanotubes, and/or highly oriented pyrolytic graphite (HOPG). Finally, the electrodes were characterized through scanning electron microscopy (SEM) and Raman spectroscopy to elucidate changes in the electrode composition resulting from the surface treatments. Major structural changes of the TPE surface are seen in the SEM images for each treatment. Interestingly, the Raman spectra suggest that the quantity of edge-type defects (crystallite domain size) did not drastically change, with little or no vacancy or sp$^3$ defects being introduced upon surface treatment. Overall, TPEs provide a significant steppingstone for future advancement in the fabrication and integration of composite carbon electrodes into high-end electrochemical systems.

Results and Discussion

Fabrication, Templating, and Patterning of Thermoplastic Electrodes (TPEs)

Figures 1B, 1C, 1D:
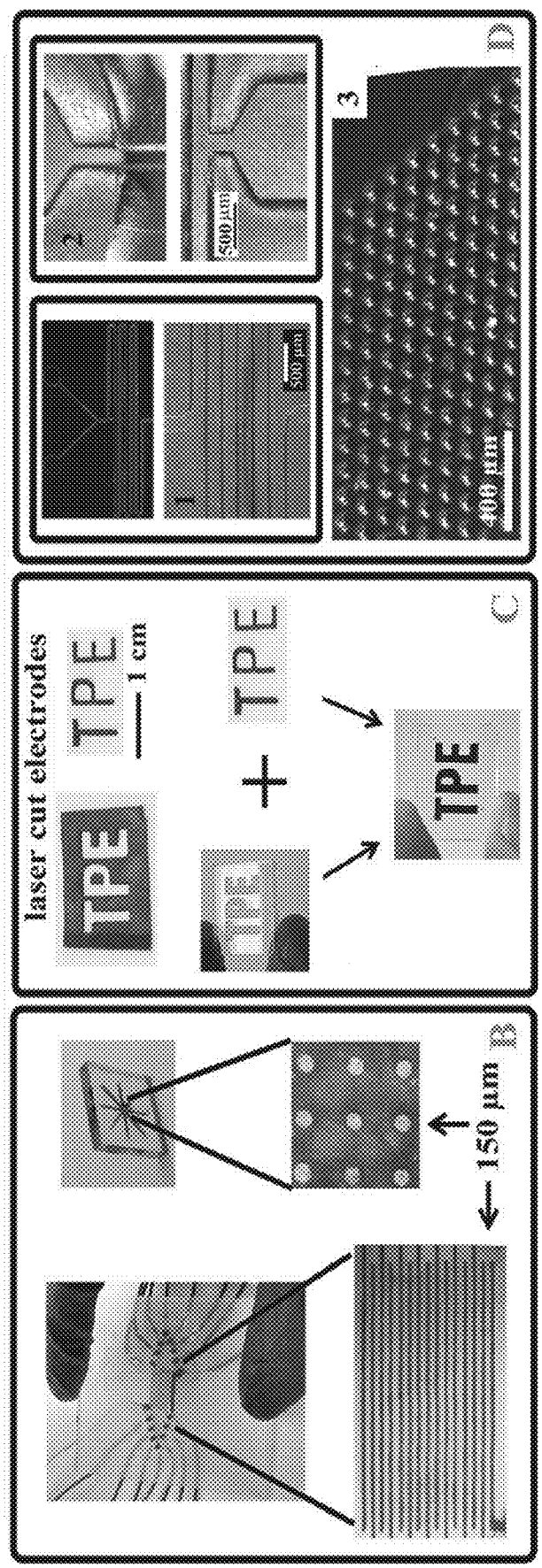

To address the key problem of ease of fabrication and templating, a simple and low-cost solvent-assisted fabrication method as an alternative to air-free in situ synthetic conditions commonly used with PMMA is disclosed herein. Templating TPEs to make complex electrode geometries is straightforward, as illustrated in FIG. 1A. Applying pressure (~50 psi) to the TPE while drying was found to be crucial to achieve a defect-free and uniform electrode material. The gum-like consistency of the partially dried TPE material allowed for easy fabrication of electrodes with micrometer-scale dimensions. The ~150 μm spot size of the $CO_2$ laser used to cut the templates defined the lower size limit of attainable features within the PMMA templates. FIG. 1B shows a 150 μm band electrode array, as well as an individually addressable disk electrode array containing 150 μm electrodes. Either electrode array would be challenging to fabricate with traditional carbon materials but can be readily fabricated with the solvent-assisted TPE system. For patterning based on cutting methods, 1-2 mm thick TPE sheets were made by pouring the mixture into a small mold. Once fully dried, the TPE sheets were cut to create electrodes with complex geometric shapes (FIG. 1C). The $CO_2$ laser TPE cutouts, when heated above the Tg (~121° C. from Plaskolite) with applied pressure (~50 psi), were readily moldable into premade PMMA templates.

Despite the high graphite mass loading in the TPE, it was envisioned that embossing could be used to create intricate patterns with the TPE material. FIG. 1D shows structures embossed directly into the TPE, including microfluidic channels and a pillar microarray. Structures like the pillar array are particularly attractive for applications where high electrode surface areas are needed. At low carbon content for all particle sizes, the TPE retains PMMA-like character and is easily embossed, while at a higher carbon content, the TPE cannot be shaped into micrometer-sized features due to the reduced PMMA binder content. We found a rough upper limit for carbon content to generate well-resolved embossed features to be 1:2 (PMMA:carbon) for the 11 and 20 μm particles, and 1:0.6 for ≤500 nm particles. The ≤500 nm particles were the most versatile for embossing intricate features, perhaps owing to the small particle size which potentially allowed for facile rearrangement of the carbon polymer matrix. The difference in quality of embossed features can be seen in FIG. 1 (D1 and D2), where the 1:2, 11 μm TPE has rounded edges but the ≤500 nm TPE has nearly perfect edges. It should be noted that the embossing parameters were not optimized, and this initial embossing work represents a starting point for more in-depth studies.

Conductivity Measurements

Figure 2:
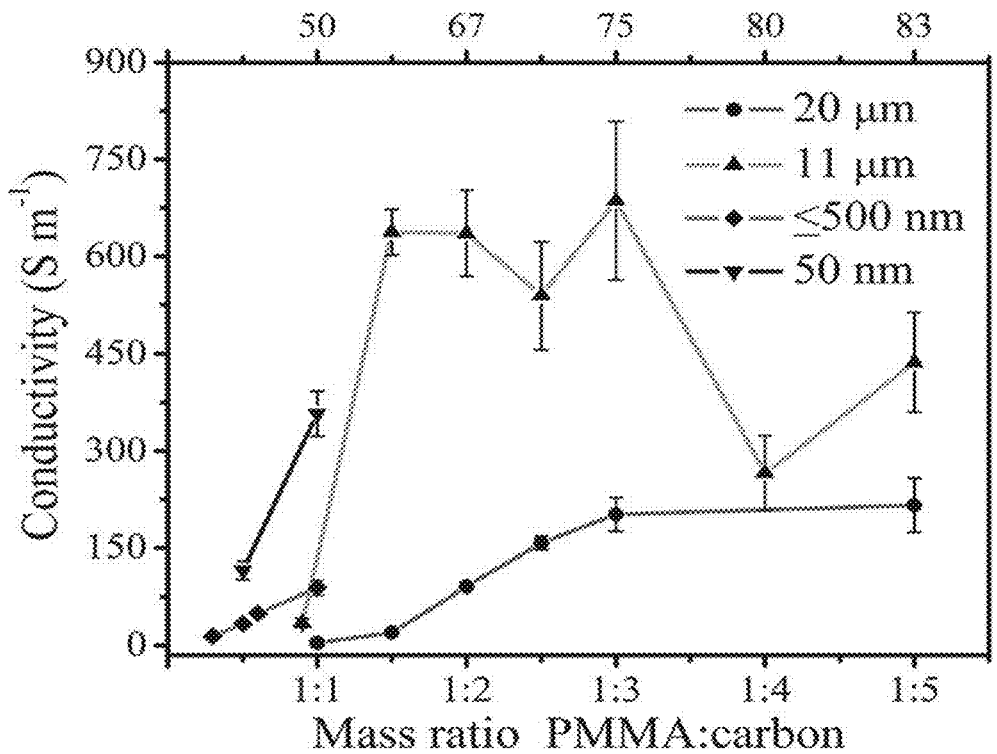
FIG. 2. Conductivity as a function of various ratios of PMMA:carbon with differing particle type and size (n=3). The 20 μm, 11 μm, and ≤500 nm particles were graphitized carbon, and the 50 nm particles were acetylene carbon black.

High electrode conductivity is critical to minimize ohmic drop and improve electrochemical performance. FIG. 2 shows a comparison of conductivity as a function of electrode composition. As expected, conductivity increased with increasing carbon content. The conductivity of the ≤500 nm TPEs did not reach saturation and was limited by physical electrode integrity. The trend was also observed for the carbon black particles (50 nm). The conductivity of the 11 μm TPEs increased initially but then decreased at higher loadings. The decrease may be due to particle agglomeration at higher mass loadings, which could limit the number of conductive pathways. A similar conductivity trend was previously observed for a carbon nanotube/graphite/epoxy composite. Similar to the 11 μm particles, the conductivity of the 20 μm TPE increases until reaching a saturation point at a 1:3 PMMA:carbon ratio. The conductivities in FIG. 2 are consistent with the literature on carbon composites with similar carbon mass loadings, while the values of the 11 μm TPEs are considered high. A recent report on a graphene screen-printed electrode proposed an "extremely high" conductivity of 11.2 S m$^{-1}$. By comparison, the best-performing 11 μm TPE reported herein exhibited an average conductivity of about 700 S m$^{-1}$ to about 1500 S m$^{-1}$.

The high conductivity of TPEs arises most likely from increased numbers of low-resistance particle-to-particle contacts. The contact resistance (quality of contact) between particles, as well as the number of contact points, determines the conductivity of composite materials. In the proposed TPE system, the contact quality and number of contacts will invariably be affected by the particle size, processing technique (pressure), particle shape, and polymer-particle wettability. Therefore, given the complexity of the TPE system, the relationship between electrode composition and the exact mechanism that governs a low or a high conductivity is not completely clear. It is clear, however, that the particle source has a profound effect on the resulting conductivity.

Besides providing conductivity information, the data in FIG. 2 can also be used to define upper and lower PMMA:carbon mass loading thresholds that allow for a usable electrode. Here, the low carbon mass loading range is defined by a conductivity of 10 S m$^{-1}$; below this threshold, significant contributions to ohmic drop are observed in an electrochemical cell. The upper limit of mass loading is defined by the mechanical instability of the electrode caused by lack of binder. FIG. 2 is also useful for defining the minimum carbon loading required to achieve the maximum electrode conductivity. Higher binder content typically yields electrodes that are more robust and easier to emboss, which have a lower capacitance. Constructing plots like FIG. 2 is then quite valuable when optimizing TPE composition for a given application.

Electrochemical Characterization of TPEs

Figure 8:
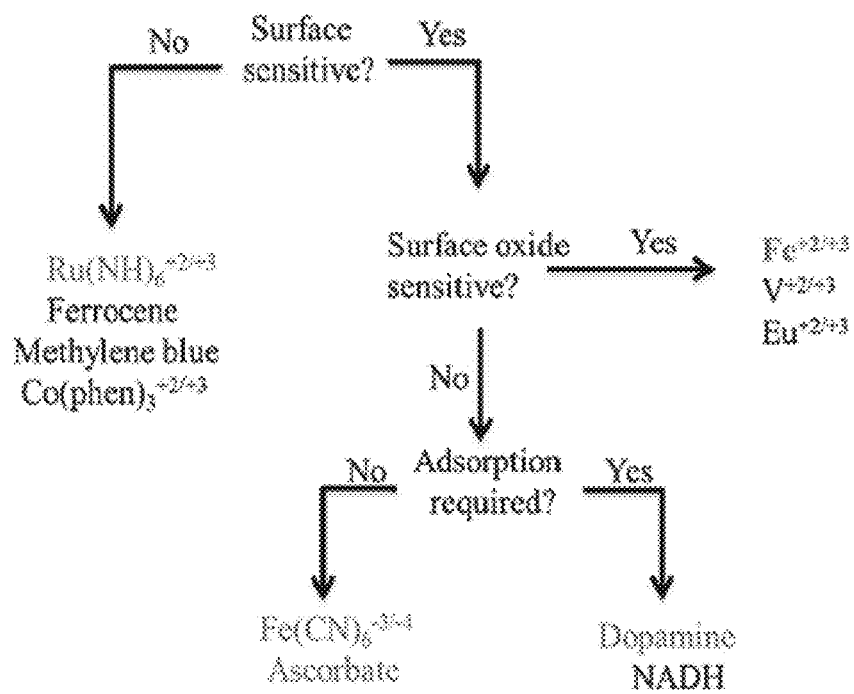
FIG. 8. Flow chart for describing electrode surface sensitivity towards various analytes.

Initially, the capacitance of various TPE compositions was quantified, as it is a major contributor to background signal that negatively affects the sensitivity and detection limits in sensing measurements. Cyclic voltammetry and electrochemical impedance spectroscopy (EIS) were used with a variety of redox probes to inform on the electrocatalytic activity of the electrodes. Redox probes were chosen to understand the impact of surface treatment (polishing, sanding with 600 grit paper, and plasma exposure) on the electrochemical properties of the TPEs. As proposed by McCreery (*Anal. Chem.* 1999, 71, 4594) (FIG. 8), species such ferricyanide, ascorbic acid, dopamine, and Fe2+/Fe3+ have electrochemical responses which are heavily dependent on the chemistry of the electrode surface (FIG. 8). The 11 μm particles in a PMMA:carbon ratio of 1:2 are highlighted in the main text due to their favorable embossing characteristics, high conductivity, electrochemical stability, and lower capacitance. Similar data for TPEs fabricated with 1:3, 20 μm and 1:0.55, ≤500 nm particles can be found in the Examples.

Capacitance.

Figure 3:
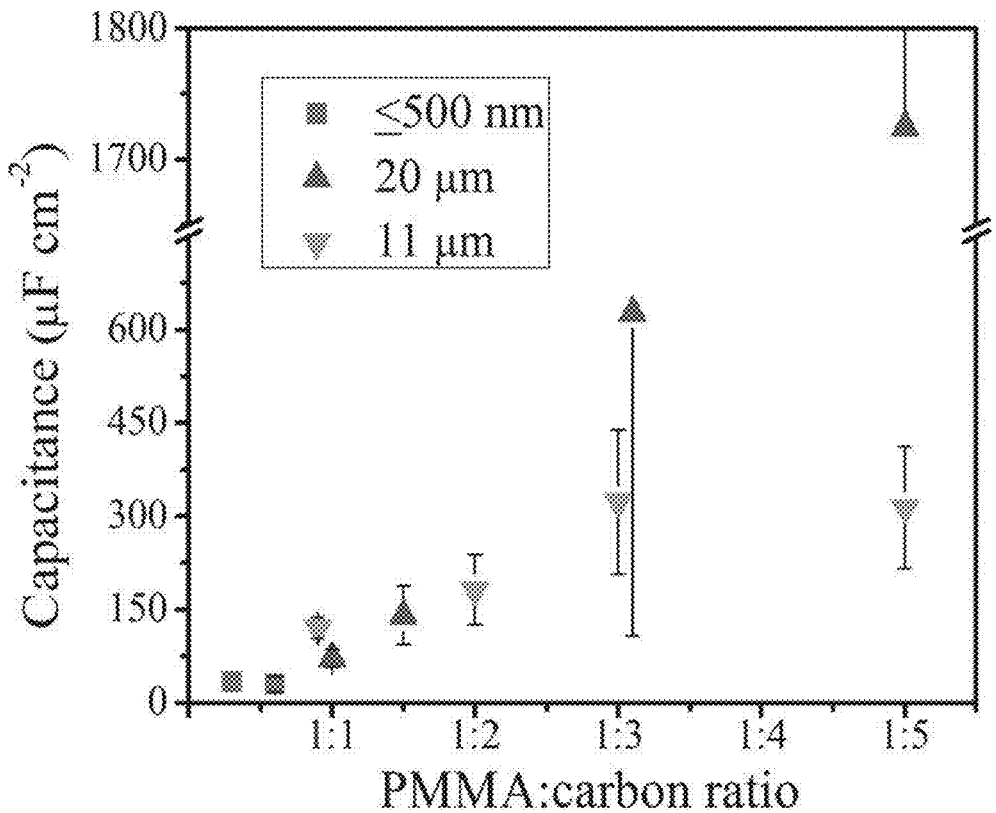
FIG. 3. Geometric area normalized capacitance as a function of PMMA:carbon mass loading and particle size with sanded electrode surfaces. For clarity; a break was placed in the Y-axis, causing truncated error bars for the 20 μm data. Error bars are calculated from a single capacitance measurement from three separate electrodes.
Figure 10:
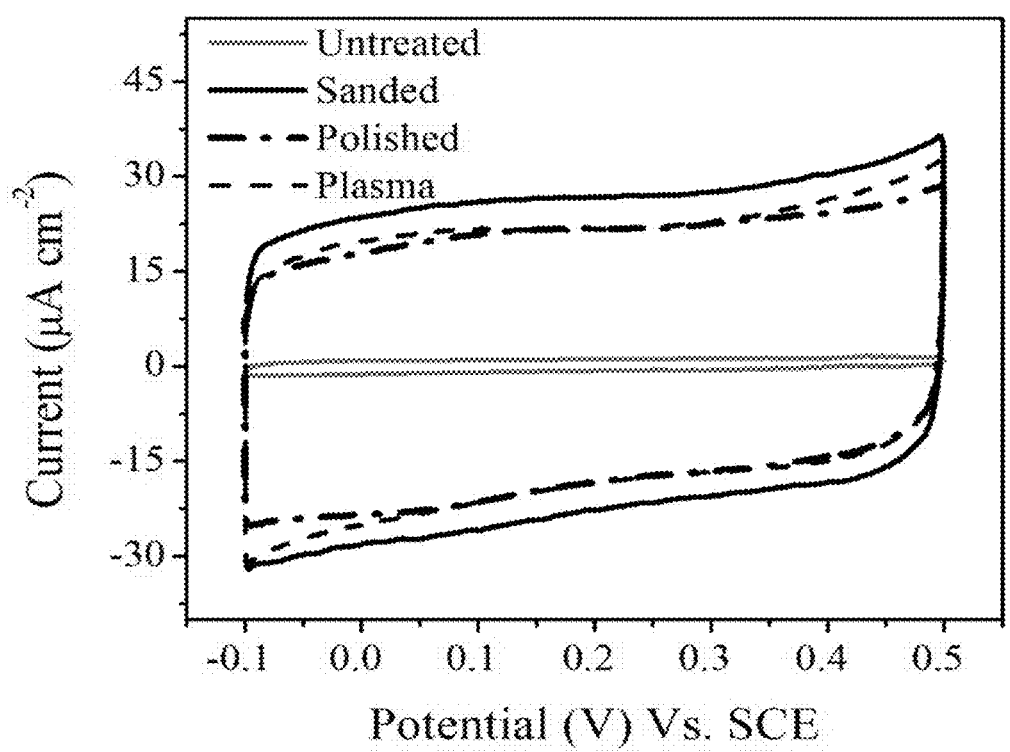
FIG. 10. Averaged cyclic voltammograms 100 mV $s^{-1}$ (n=3) from the various surface treatments performed on a 1:2, 11 μm TPE. The solution for all capacitance measurements, including the main text, was 0.5 M KCl.

Electric double layer (EDL) values of TPEs were calculated from cyclic voltammetry (FIG. 10) in 0.5 M KCl. Capacitance increases with carbon content for all electrodes and was higher than for common planar electrodes (FIG. 3). Typical capacitance values for planar metal (platinum, gold) electrodes are 20 μF cm$^{-2}$, for glassy carbon electrodes are 24-36 μF cm$^{-2}$, and for basal and edge plane graphitic carbon electrodes are ≤2 and ~60 μF cm$^{-2}$, respectively. The 2-20 times increased capacitance for many of the 11 and 20 μm TPEs above planar edge or basal graphite points toward an electrode with some surface roughness, especially in the higher carbon-to-PMMA ratios. The dependence of capacitance on graphite content is highlighted with the 1:5 PMMA:carbon TPE using 20 μm particles, where a break in the axis is needed to clearly present all the data. The ≤500 nm TPE had capacitance of 35±15 μF cm$^{-2}$, which is more consistent with a planar carbon electrode, and similar to the average capacitance of 37 μF cm$^{-2}$ of the tested DropSens commercial screen-printed carbon electrodes. Lastly, FIG. 3 shows data for the sanded treatment. In general, it was found that the surface treatments did not significantly affect the capacitance (FIG. 10); however, the untreated electrodes had a lower capacitance (~8 μF cm$^{-2}$), most likely from plastic binder coating some graphite particles. The surface deactivation of the untreated electrode is consistent with data presented in the following sections.

Comparison to Commercial Electrodes.

Figure 4:
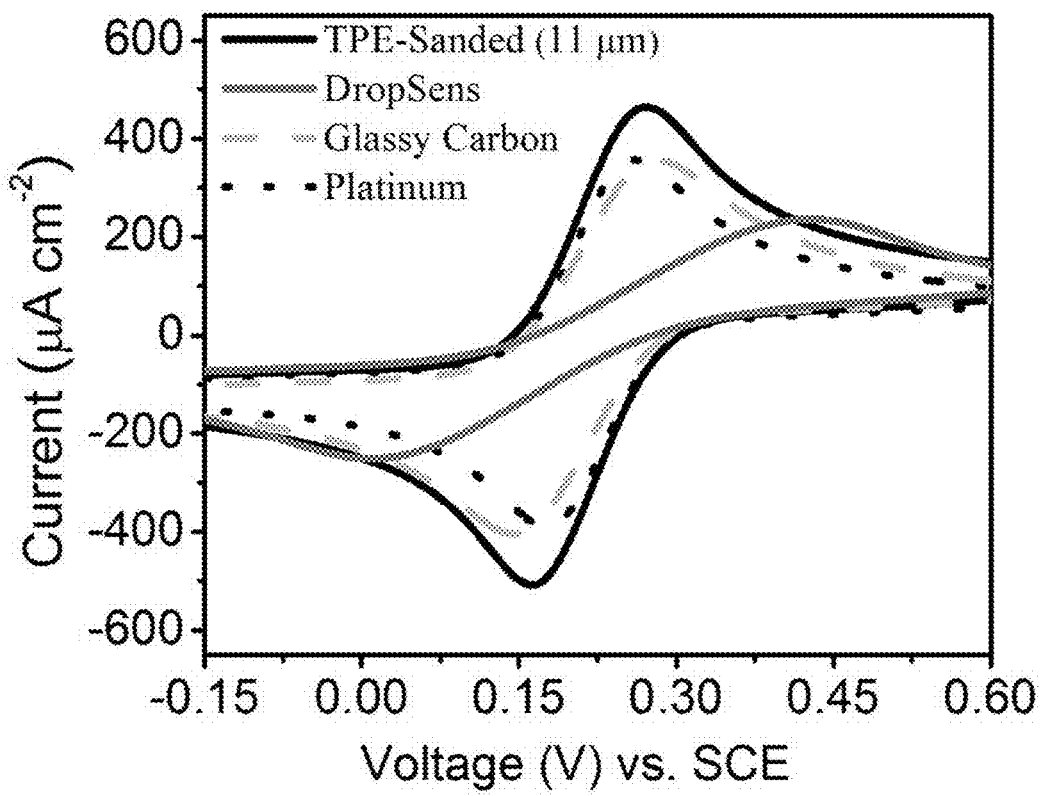
FIG. 4. (top) Cyclic voltammetry of a 1:2, 11 μm sanded TPE, Pt, GC, and DropSens electrodes with potassium ferricyanide redox couple (10 mM), scan rate was 500 mV $s^{-1}$. (bottom) Impedance spectra (Nyquist plot) taken directly after the cyclic voltammograms. Note, the spectra are manually shifted on the x-axis for clarity.
Figure 4:
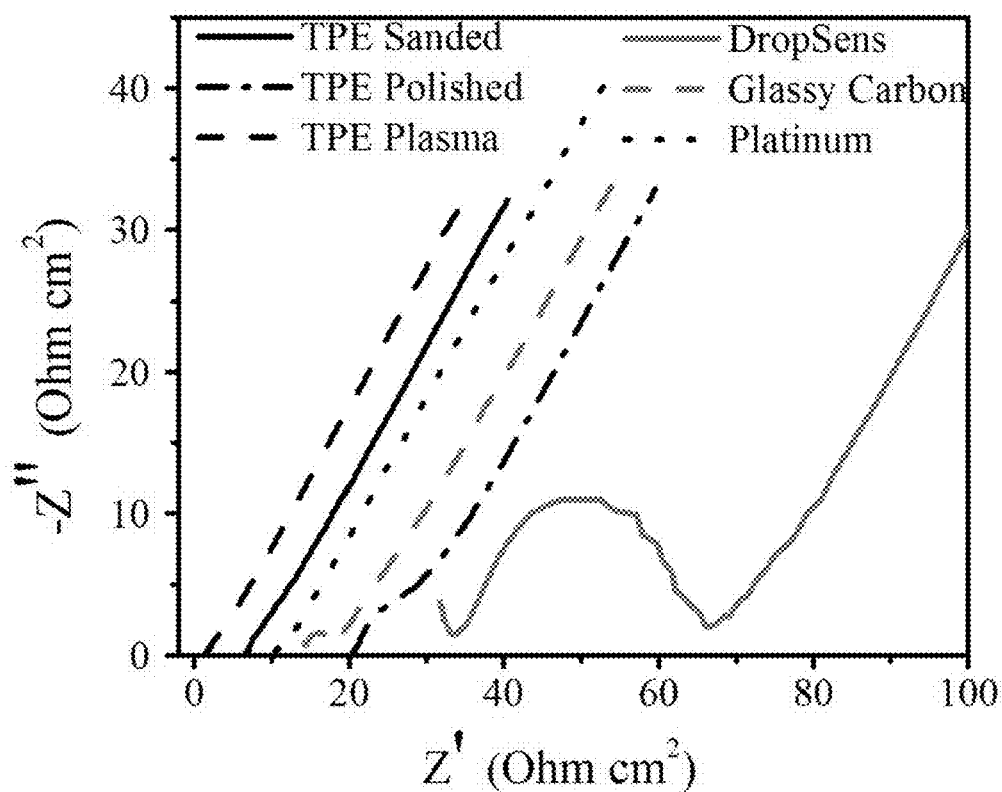

A comparative study of TPEs to commercially available carbon and Pt electrodes was performed using cyclic voltammetry and EIS (FIG. 4). Ferricyanide was used because it is surface sensitive and a popular molecule for initial electrode characterization. DropSens CPE have been reported to have a more favorable electroactivity compared with other commercially available composite electrodes and make for a suitable comparison to TPEs. The cyclic voltammograms show peak separations of 140, 90, 400, and 110 mV for glassy carbon, Pt, screen-printed carbon, and TPE electrodes, respectively. The 10 mM concentration and 500 mV s$^{-1}$ scan rate induce high current densities, which can be difficult for an electrode to meet. However, using these conditions the TPE had a peak current of 500 μA cm$^{-2}$, close to the ideal peak current density (510 μA cm$^{-2}$) as calculated from the Randles-Sevcik equation (eq. 5), and the highest of all electrodes tested. It is noteworthy that the peak separation with the TPE is more like glassy carbon and platinum, most likely from the intrinsic high conductivity. Peak separation is often used for extracting kinetic information, however, in this instance cell resistance/ohmic drop cannot be ruled out as a contributing factor to peak separation. Therefore, EIS was used to gain insight into electrode kinetics as it can decouple cell resistance/ohmic drop from charge transfer resistance.

In FIG. 4B the TPEs with surface treatments are compared with screen-printed carbon, Pt, and GC electrodes. The spectra are shown in decreasing charge transfer resistance (diameter of semicircle) with the spectra manually shifted on the x-axis for clarity. The impedance spectra for the sanded and plasma treated TPEs have no discernible charge transfer resistance. Under these conditions, TPEs appear to be kinetically similar to Pt as well as seemingly outperforming glassy carbon and screen-printed carbon. Attempts were made to sand and plasma treat the screen-printed carbon electrode similar to the TPE treatments, but in both cases electrode performance did not improve. Interestingly, polishing the TPE had a detrimental effect on its charge transfer resistance, seen as a larger partial semicircle in the Nyquist plot. The SEM images in the following section show that graphite particles are significantly rearranged with polishing and may give a clue into the origin of the higher charge transfer resistance.

Figure 9:
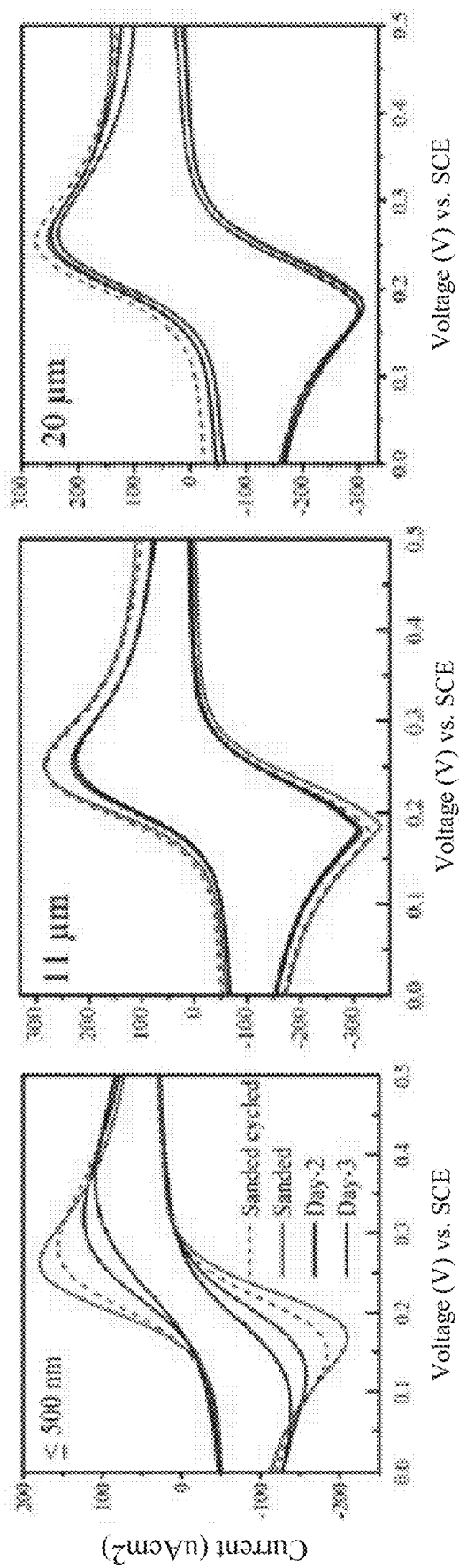
FIG. 9. Stability data for a 1:0.55, ≤500 nm TPE, 1:2, 11 μm TPE, and 1:3, 20 μm TPE over the course of 3 days in 0.5 M KCl with 1 mM ferricyanide at 100 mV $s^{-1}$. The dotted lines are after repeated cycling (25 cycles) in ferricyanide on the first day of testing. The electrodes were left, dry, in ambient atmosphere between trials. Fresh solution was used for each day of testing and minor changes in concentration from day to day may be expected.

Finally, the stability of the TPEs was tested over the course of 3 days with ferricyanide using the simplest surface treatment (sanded). The electrodes were tested, rinsed with Millipore water, then left in ambient air. The cyclic voltammograms in FIG. 9 show a 14% and 1% loss of peak current after the first day, which is unchanged on day 3, for the 11 and 20 μm TPEs, respectively. Through cycling and aging both the 11 and 20 μm particles saw nearly a 10 mV increase in peak separation. In contrast, the ≤500 nm TPE saw a 30% and 50% decrease in peak current after the first and second days, with nearly a 200 mV increase in peak separation after 3 days of aging. It seems likely that the freshly sanded/cleaved surface of the TPE is picking up contamination slowly from the ambient conditions, and the mechanism is heavily dependent on the particles used in the TPE. Similar fouling was seen on freshly cleaved HOPG under ultra-pure conditions.

Surface-Insensitive Probe.

Figure 5:
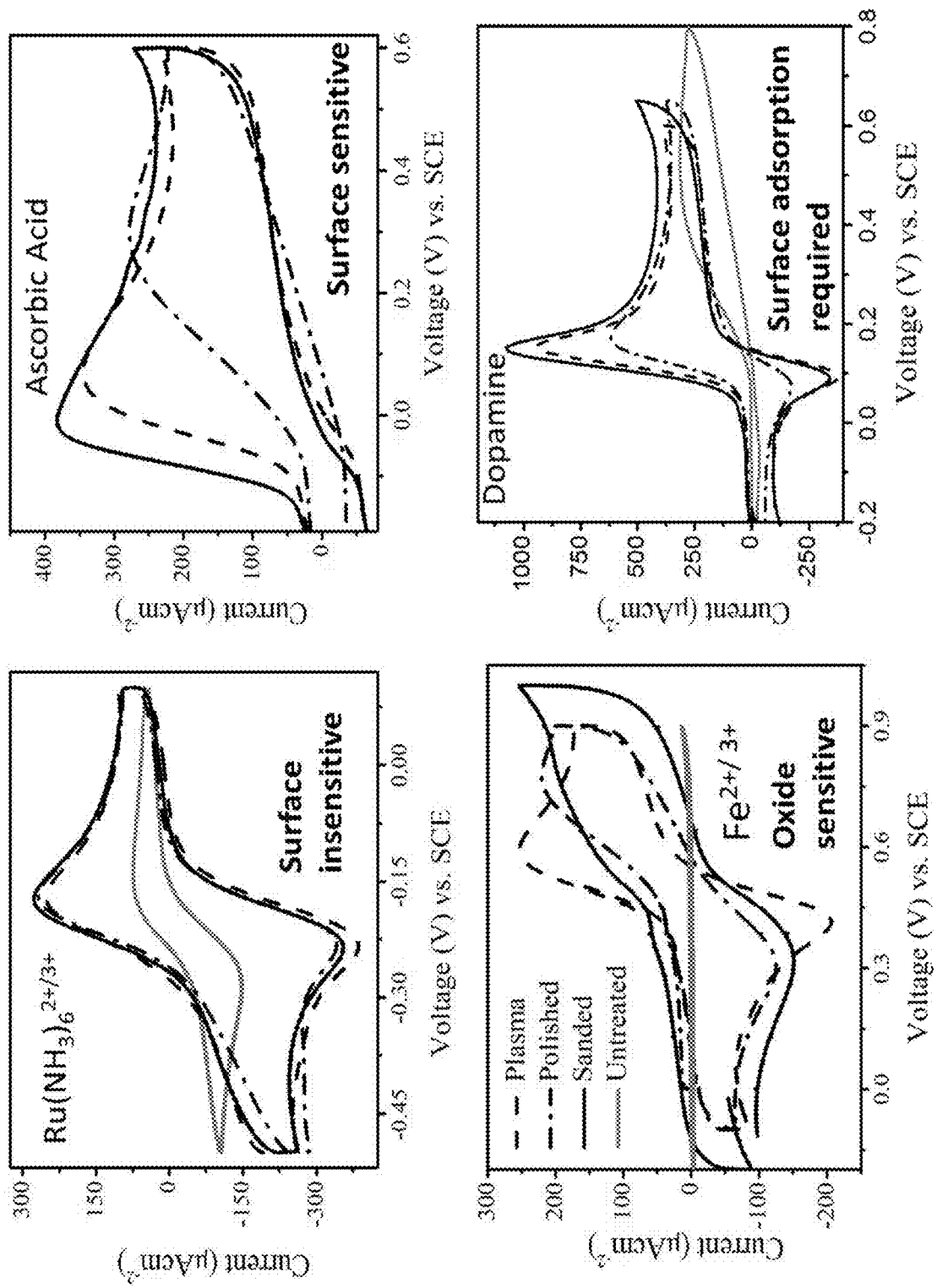
FIG. 5. Cyclic voltammograms of a 1:2, 11 μm TPE with $Ru(NH_3)_6^{2+/3+}$. The electrolyte for $Ru(NH_3)_6^{2+/3+}$ was 0.5 M KCl; 1 mM ascorbic acid (AA); 1 mM dopamine (DA) in 0.1 M phosphate buffer at pH 7.4. Cyclic voltammograms showing differences in peak separation with the various surface treatments.

$Ru(NH_3)_6^{2+/3+}$ was used to establish Nernstian voltammetric responses from the TPE and to gauge the non-surface-reliant activity of the electrode (FIG. 5). $Ru(NH_3)_6^{2+/3+}$ is well known to be insensitive to the electronic and/or chemical structure of the electrode surface and has been used to calculate electrochemically active surface area. It was observed that untreated TPEs, for three separate electrodes, gave a lower current density (140±50 μA cm$^{-2}$) than theoretically predicted (240 μA cm$^{-2}$), suggesting surface deactivation. Interestingly, the untreated electrode appears to display microelectrode behavior, evident from the quasi sigmoidal shape of the voltammogram, most likely arising from "active islands" of graphite. Microelectrode behavior is a well-known characteristic of some composite electrodes. When TPEs are sanded, polished, or plasma treated, the electrochemical activity is substantially higher. At a 100 mV s$^{-1}$ scan rate, peak separation for the TPEs are close to Nernstian at 61±2 mV (three separate electrodes). Since the peak currents are close to theoretically predicted, massive amounts of nano- or microscopic porosity are not expected with the chosen TPE composition. Sponge like porosity can cause an increase in peak current in a cyclic voltammogram from thin layer effects within the porous electrode material, which can be problematic with electrochemical characterization of small carbon particles like carbon nanotubes, graphene, and, potentially, composite electrodes. Importantly, while the 1:2, 11 μm TPE does have increased surface roughness shown from capacitance measurements, it does not appear that the electrode has excessive sponge-like porosity with all surface treatments.

Oxide-Sensitive Probe.

The $Fe^{2+/3+}$ redox couple is known to be highly sensitive to surface carbon oxides. The cyclic voltammograms in FIG. 5 show a drastic difference in peak separation with the various surface treatments. After plasma exposure, the TPEs exhibit well-defined reversible peaks, implying the addition of quinone functionality. The peak separation for a plasma treated surface is 150 mV, which is comparable to an electrochemically heavily oxidized highly oriented pyrolytic graphite (HOPG) electrode. Sanded and polished surfaces have peak separations nearing 400 mV, more akin with GC electrodes polished under ambient conditions. Plasma generation of oxides on graphite is well known and is most likely the cause of the peak separation decrease. Oxygen groups generated from milling or sheering in the fabrication of the micrometer-sized carbon particles could explain the partial activity of the sanded and polished electrodes toward $Fe^{2+/3+}$. It can thus be concluded that the graphite most likely contains quinone functionalities with all surface treatments, with plasma treatment yielding the highest population of oxygen moieties on the carbon surface.

Surface-Sensitive Probe.

Figure 11:
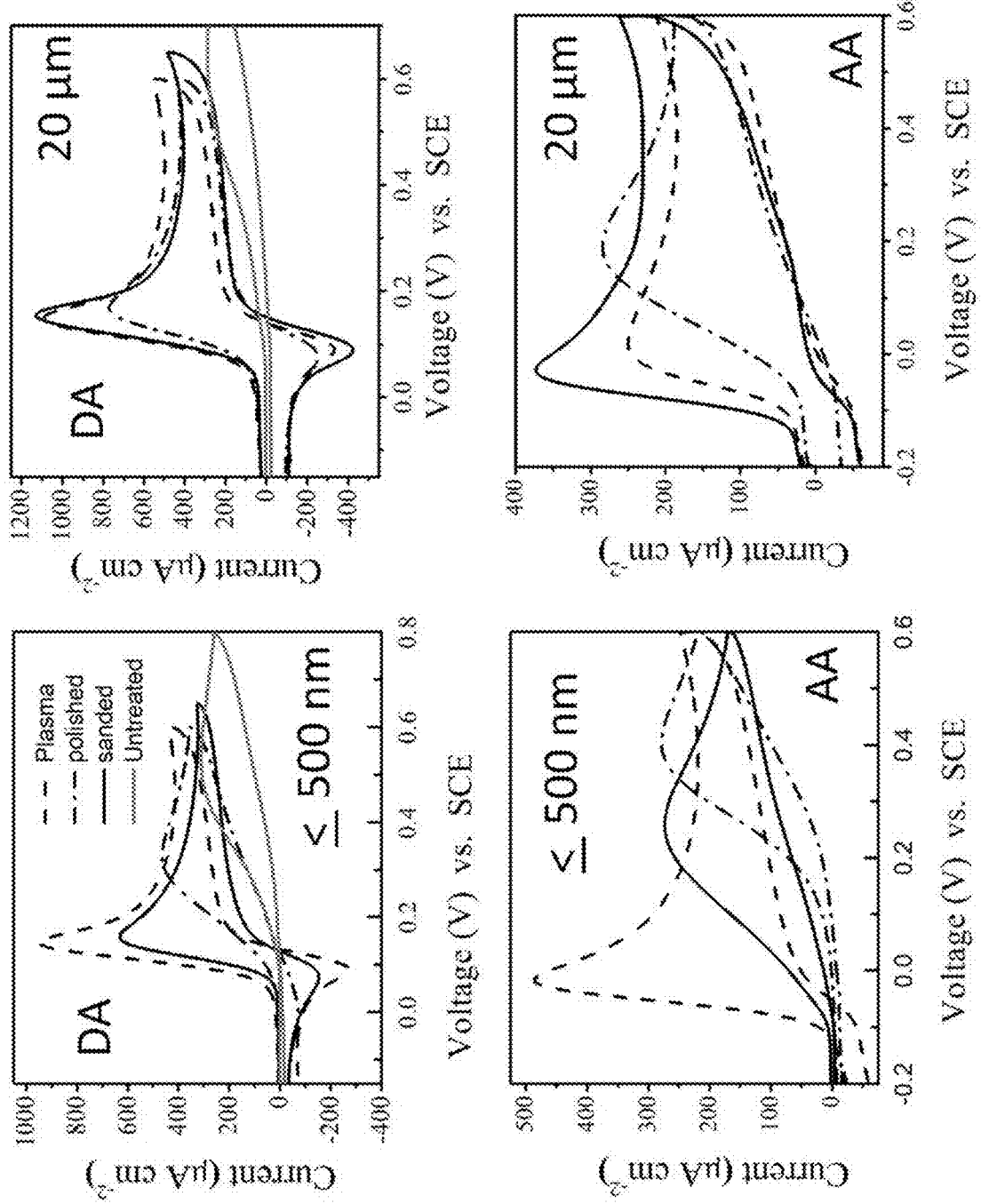
FIG. 11. Cyclic voltammograms 100 mV $s^{-1}$ of a 1:0.55, <500 nm, and 1:3, 20 μm TPE with 1 mM ascorbic acid (AA), 1 mM dopamine (DA), in 0.1 M phosphate buffer at pH 7.4.
Figure 12:
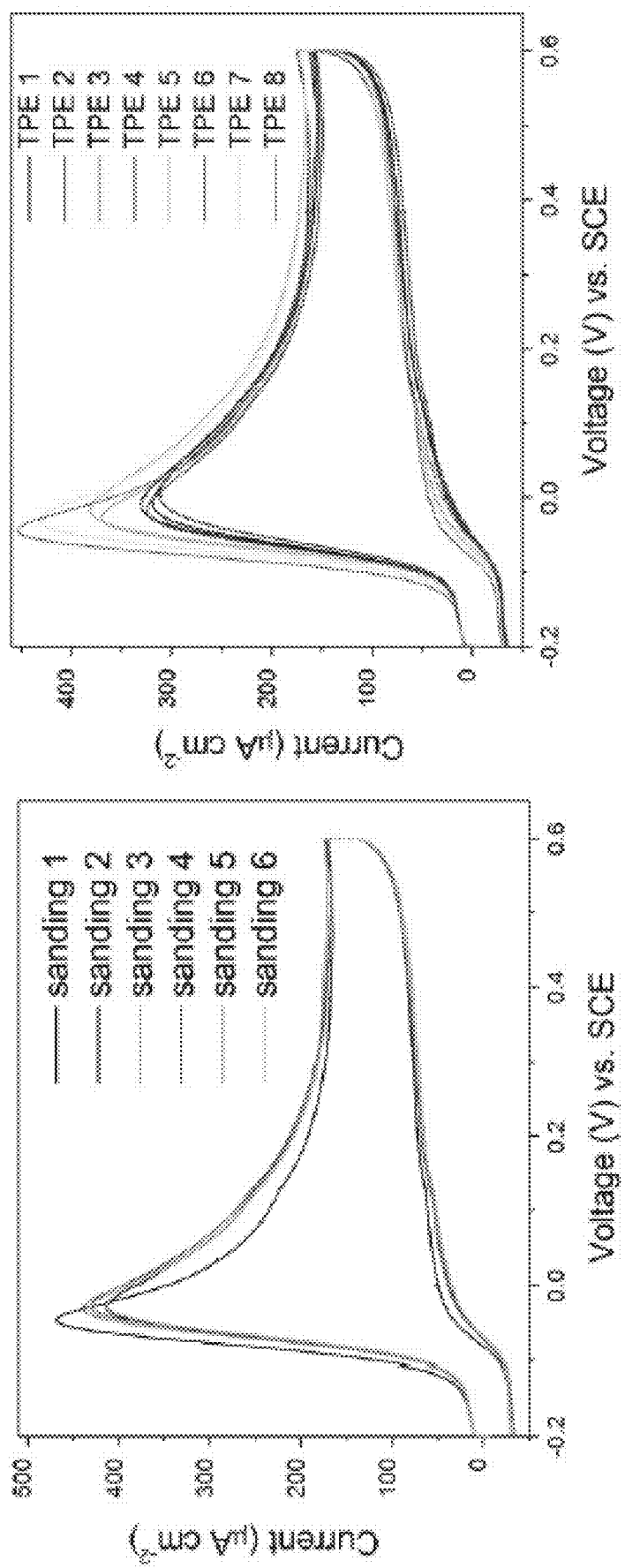
FIG. 12. (left) Cyclic voltammetry of 11 μm TPE in a ratio of 1:2 PMMA:carbon with 1 mM AA in phosphate buffer at pH 7.4. (right) Cyclic voltammetry for 8 individual 11 μm TPE in a ratio of 1:2 PMMA:carbon with 1 mM AA in phosphate buffer at pH 7.4. Scan rates for all trials were 100 mV $s^{-1}$.

The oxidation of ascorbic acid (AA) is an irreversible two electron, two proton process, that is highly surface sensitive. The electrochemical oxidation of AA can be problematic and numerous electrode modifications have been proposed to enhance electrode kinetics. The voltammetry of AA at TPEs (FIG. 5) appeared to have no pre-concentration effects, in agreement with predicted responses (FIG. 8), and aligned relatively well with predicted peak currents. Calculation of theoretical peak current (343 μA cm$^{-2}$) requires a different equation than the previously used Randles-Sevcik equation as detailed in eq. 4. The polished electrode gave a lower peak current and a ~400 mV positive shift in the peak potential, demonstrating the extreme surface sensitivity of AA oxidation. The average onset potential of a sanded single TPE (repeated six times) was −0.032±0.008 V vs SCE, which is similar to or better than that of electrodes composed of carbon nanotubes or graphene, and lower than edge plane HOPG (0.2 V vs SCE). With the sanded TPE, the peak does not shift to higher potentials with repetitive cycling, although the peak current decreases by 26% after 25 cycles. The peak current for the plasma-treated TPE had excellent stability and remained essentially constant through repetitive cycling. One explanation for the stability may be from the introduction of additional oxygen moieties on the plasma-treated TPE, which have been shown to give an enhanced and stable electrochemical response for AA, DA, and uric acid. FIG. 11 contains cyclic voltammograms for TPEs with 20 μm and the ≤500 nm particles with AA. The TPEs with 20 μm particles had voltammetry similar to that of the 11 μm particle TPE, while the ≤500 nm particles-based TPE typically had lower peak currents and increased overpotentials with sanding and polishing conditions. Lastly, the reproducibility of the 11 μm TPE was examined with AA; representative data are shown in FIG. 12. For two separate TPEs, repeatedly sanded (n=6), peak current RSDs of 5.1% and 8.0% were observed. The RSD of peak current across 8 individual electrodes was 15.4%. In addition, the oxidative peak location was quite sensitive to sanding with an average across all eight electrodes of −0.023±0.016 V vs SCE.

Surface Adsorption Dependence.

The electrochemistry of dopamine is known to vary on different types of graphitic surfaces. For example, with HOPG, there are accounts of low activity on the basal plane compared to edge plane sites. It is also known that the cleanliness of the surface and preparation of basal plane HOPG greatly affects the voltammetry of dopamine. FIG. 5 shows the peak locations are in general agreement for clean graphitic surfaces, with the oxidative peak current occurring at 0.147±0.007 V vs SCE (eight separate electrodes/sanded treatment). It was found that the peak currents with TPEs and dopamine do not follow the Randles-Sevick equation for a two-electron oxidation (490 μA cm$^{-2}$). The observed current was closer to a four-electron process, arising most likely from dopamine pre-concentration (adsorption) on the surface as seen for other composites. Similar trends were observed for 20 μm and ≤500 nm TPEs (FIG. 11). Dopamine fouling (at 1 mM) is reportedly different for edge plane and basal plane graphite. For HOPG, the oxidation peak potential shifts only slightly with edge plane fouling, while the peak current is reduced to roughly 50%, before becoming relatively stable. With TPEs, the fouling appears to be edge-plane dominated for sanded and plasma-treated electrodes. Remarkably, the peak current and peak location for plasma treated electrodes at 1 mM remains stable with cycling. Similar to the cycling stability of AA, the enhanced stability toward DA may be related to an increase in oxygen functionalities.

The reproducibility of the 11 μm electrodes was tested with the same conditions as in FIG. 5 using DA. For three individual TPEs, which were each repetitively sanded (n=6) to expose a fresh surface, the RSDs for oxidative peak current were 6.0%, 4.7%, and 11.7%, for an average of 7.5%. The RSD for oxidative peak current across eight different individual TPEs was 11.8%, implying that reproducibly is dominated by the surface treatment. The oxidative peak location had an RSD of 4.5% for the eight individual TPEs, and an average RSD of 1.7% for three individual electrodes repetitively sanded. Unlike AA the reproducibility of DA in terms of peak location seems more favorable across different electrodes with a standard deviation of 0.007 vs 0.016 V for DA and AA, respectively. Overall, considering the highly surface sensitive nature of DA and AA, the general reproducibility of TPEs is promising.

TPE Surface Treatment and Characterization.

SEM Characterization of TPEs.

Figure 6:
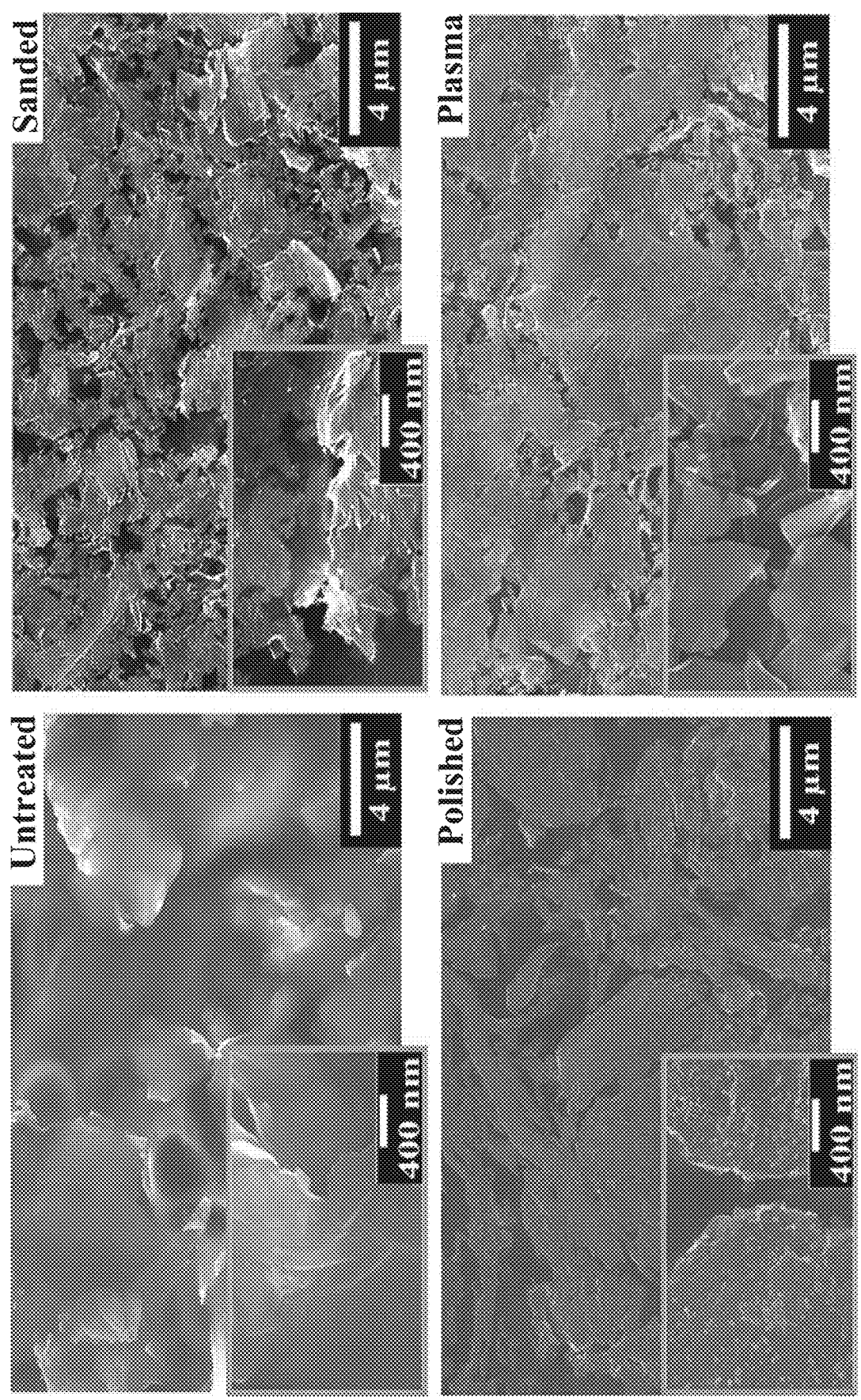
FIG. 6. SEM images at 5000× of a 1:2, 11 μm TPE subjected to the various surface treatments. The insets are at 50000× magnification of the surface.
Figure 13:
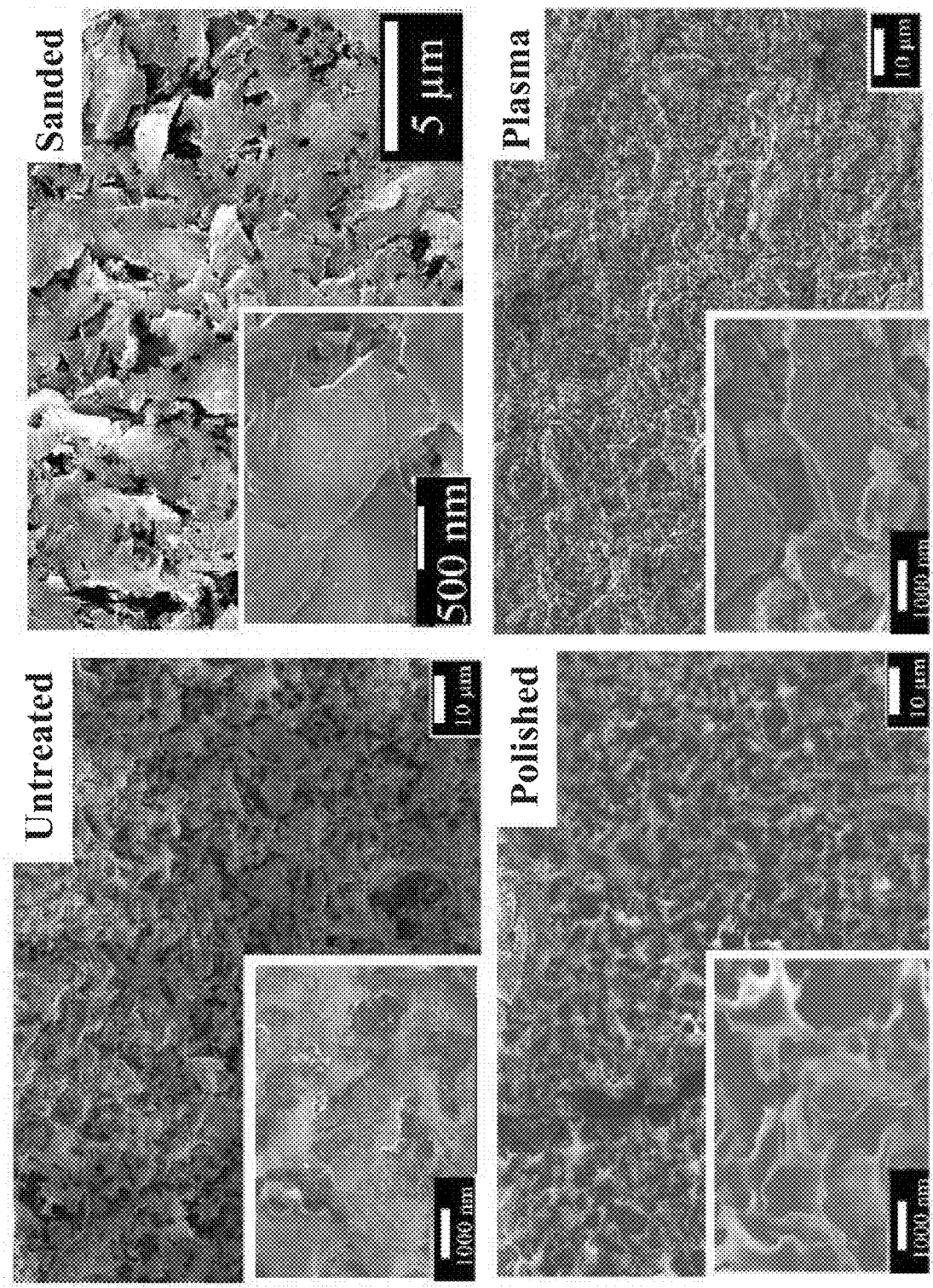
FIG. 13. SEM images of a 1:3, 20 μm TPE with various surface treatments.
Figure 14:
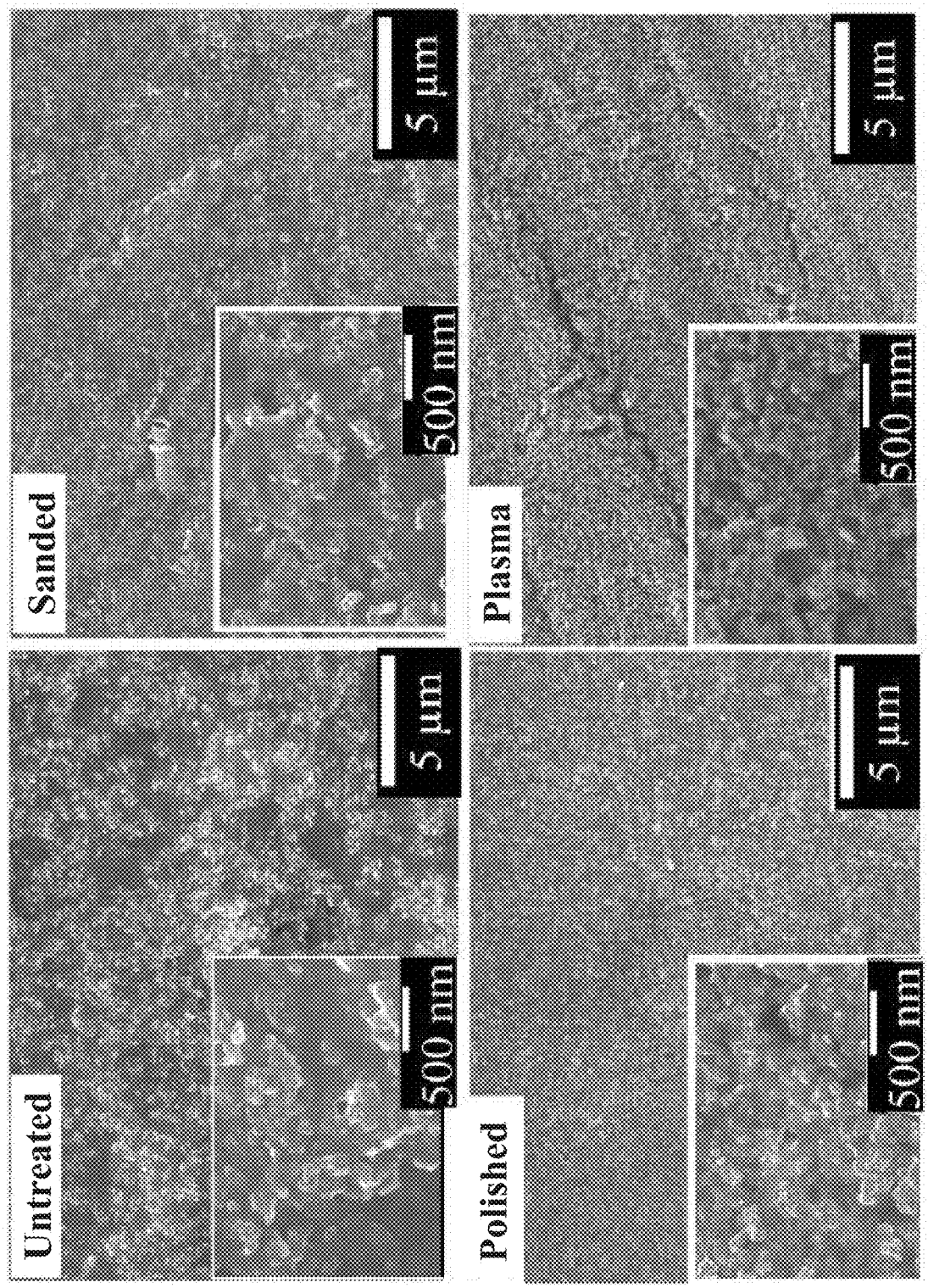
FIG. 14. SEM images of a 1:0.55, <500 nm TPE with various surface treatments.

The electrochemistry of TPEs is profoundly affected by surface treatment. SEM and Raman spectroscopy were used to gain insight into structural or chemical changes following the surface treatments. The SEM images in FIG. 6 show a significant difference in the TPE surface as a function of treatment method. First, the untreated surfaces (top left) appear to be coated with a polymer film. The lack of charging implies that the polymer film is thin, given that electrons can efficiently migrate to conductive networks in the TPE during imaging. Second, relative to the untreated electrode, the sanded electrode (top right) has large jagged domains of exposed graphite. The sanded surface is highly complex and undoubtedly contains a myriad of unique carbon chemical environments, including edge planes, ideal for facilitating electrochemical charge transfer. Third, the polished TPE (bottom left) has a drastically altered surface containing clumps or islands where individual graphite sheets are almost unobservable, which may explain the significantly diminished electrochemical response. Finally, the plasma treated electrode (bottom right) is seemingly devoid of polymer binder on the surface, and the removal of binder has exposed thin (semitransparent) sheets of graphite (inset). One hypothesis as to the origin of the thin graphite sheets is that sheer force from sanding is exfoliating the graphite. Excess PMMA is then removed from the exfoliated graphite via the plasma treatment, which ultimately creates graphene-like regions on the TPE surface. Sheer force has been reported to produce high quality graphene in large quantities. Additionally, the plasma-treated and sanded 11 μm electrodes are strikingly similar to a graphene film mechanically pressed onto a plastic substrate. TPEs made with the 20 μm particles had morphologies similar to the 11 μm particles for the respective surface treatments (FIG. 13). The ≤500 nm TPE was void of the appearance of graphitic sheets and had small, uniform ~100 nm features, as well as having much less morphological diversity than the 11 μm electrodes as a function of electrode treatment (FIG. 14).

Raman Characterization of TPE.

Figure 7:
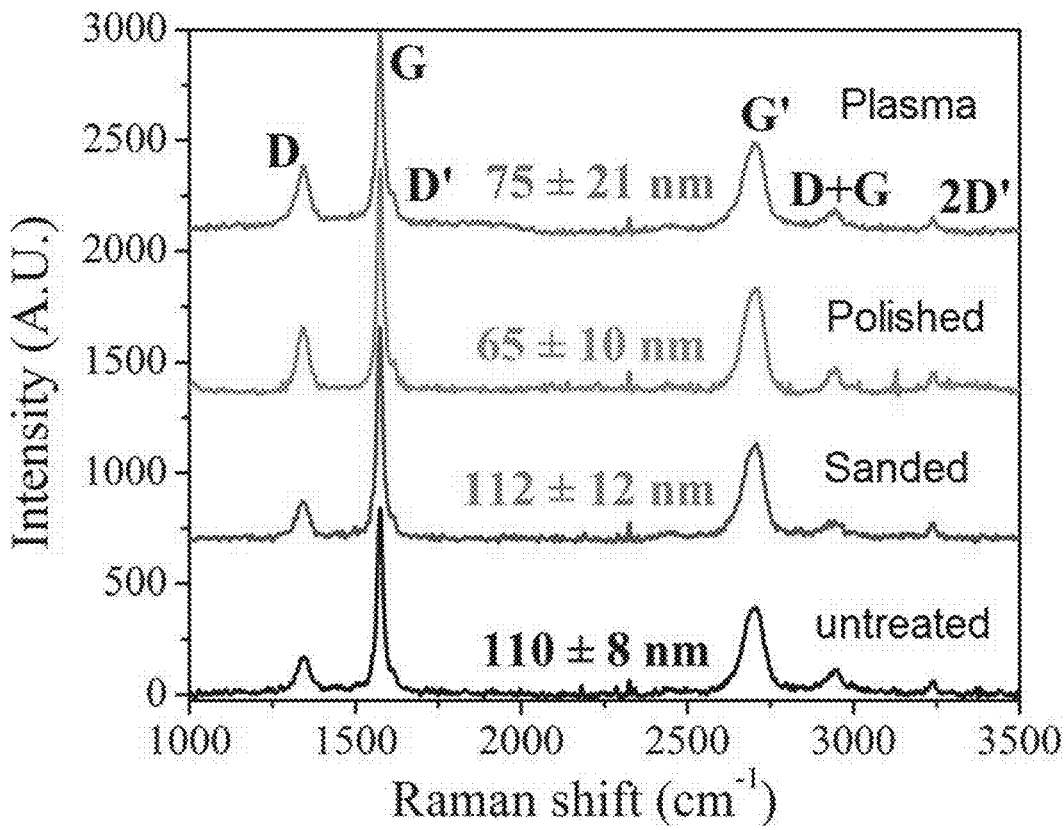
FIG. 7. Raman spectra of a 1:2, 11 μm TPE subjected to various surface treatments. Graphite crystallite domain sizes are listed above each spectrum and calculated from eq. 2 taken from the data in Table 1.
Figure 15:
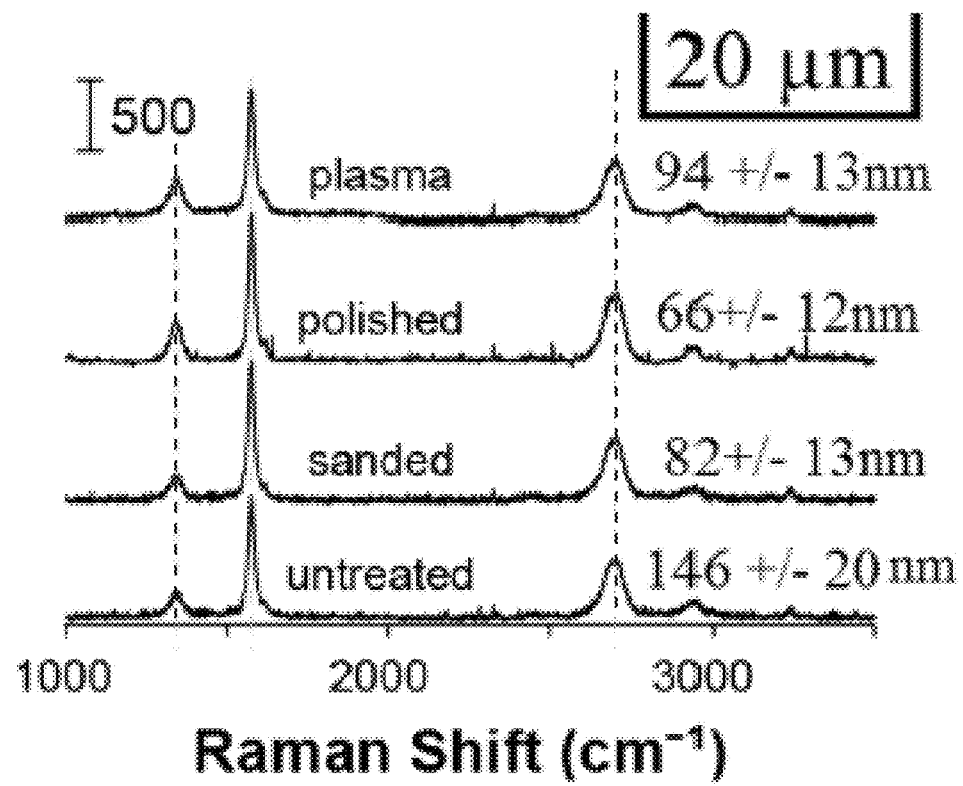
FIG. 15. Averaged Raman spectra of a 1:3, 20 μm and 1:0.55, <500 nm TPE with various surface treatments. The calculated (eq. 2) crystallite domains are above the respective spectra.
Figure 15:
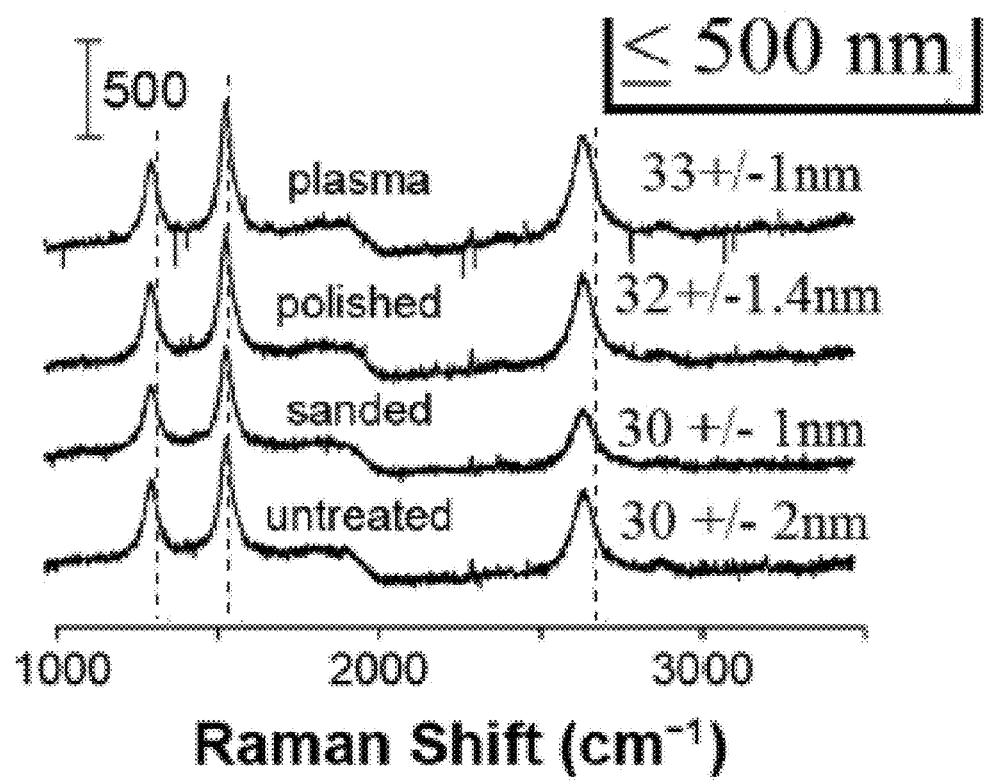

Finally, the TPEs were characterized with Raman spectroscopy to observe chemical changes which could impact electrochemical performance (FIG. 7 and FIG. 15). The spectra in FIG. 7 represent the average of 49 individual spectra. For all treatments, peaks associated with polycrystalline $sp^2$ carbon are clearly present (Lorentzian peak fitting results are shown in Table 1) Although mechanical exfoliation of the graphite via sanding or polishing might shift the G' peak position toward lower wavenumber from thinning the graphite sheets, no significant peak shifting between different surface treatments was seen. Additionally, changes in the number of $sp^3$ defects from treatments would increase the width of the D and G peaks, which was also not observed. Considering mechanical abrasion, plasma treatment, and sheer are known to introduce defects and drastically change graphite composition, it seems unlikely that these processes are not happening in some amount at the TPE surface. The lack of changes seen in the spectra are perhaps from the Raman laser probing subsurface within the TPE, rather than Raman scattering from the outermost electrode surface. The similarities between the untreated sample and other treatments seems to support this hypothesis. It is also possible that graphite particles are not changing in a sufficiently large enough quantity as to largely affect the Raman signal. A combination of these two points is also quite logical.

The Lorentzian peak fitting of the spectra can be used to elucidate small changes. The D/G peak intensity ratio can be used to gauge the amount of disorder in a graphite sample. Related to the amount of disorder is the crystallite domain, and a general equation based on the D/G ratio can be used to estimate the crystallite domain size (eq. 2). The calculated domain sizes are listed in FIG. 7 above the spectra and indicate there is a slightly larger crystallite domain in the untreated and sanded samples, with polishing having the smallest crystallite domain. A similar trend was seen with the 20 μm particles-based TPE (FIG. 15). The ≤500 nm TPE had essentially no crystallite domain size changes among surface treatments. The smaller domain size, seen with the 11 and 20 μm particles is reasonable since plasma treatment and polishing are secondary, coming after an initial sanding step. The values in FIG. 7 imply that the changes in crystallite domain size are small but give evidence toward polishing and plasma treatment chemically altering the carbon particles or removing larger particles. The plasma-treated TPE had the largest standard deviation associated with the crystallite domain (21 nm), as well as the largest relative standard deviation (28%). The larger standard deviation would suggest a more heterogeneous surface, qualitatively consistent with the SEM images. Finally, while it is clear that the surface treatments can induce some effect upon the carbon at the TPE surface, at this time, relating these differences to changes in the electrochemistry is not straightforward.

TABLE 1

Average and standard deviation from 49 individual Raman spectra of PMMA:carbon of 1:2, 11 μm, 1:3, 20 μm and 1:0.55, <500 nm TPE with various surface treatments.

| 20 μm | 2D' peak location | error | 2D' Height | error | 2D' Width | error | D + G peak location | error | D + G Height | error | D + G Width | error |
|---|---|---|---|---|---|---|---|---|---|---|---|---|
| untreated | 3239.5 | 2.6 | 54.0 | 6.5 | 23.2 | 2.8 | 2941.5 | 3.4 | 42.7 | 4.0 | 42.7 | 7.7 |
| sanded | 3238.9 | 2.0 | 73.4 | 9.6 | 14.3 | 2.1 | 2941.1 | 2.8 | 36.7 | 8.6 | 44.1 | 7.8 |
| polished | 3239.7 | 1.6 | 89.4 | 9.2 | 14.8 | 1.3 | 2939.8 | 1.9 | 66.1 | 16.6 | 45.1 | 4.5 |
| plasma | 3239.2 | 2.0 | 79.9 | 6.2 | 18.1 | 2.1 | 2939.3 | 2.3 | 48.9 | 19.3 | 45.0 | 3.9 |

| 20 μm | 2D peak location | error | 2D Height | error | 2D Width | error | G peak location | error | G Height | error | G Width | error |
|---|---|---|---|---|---|---|---|---|---|---|---|---|
| untreated | 2702.8 | 1.4 | 386.9 | 30.4 | 60.0 | 1.4 | 1574.4 | 1.3 | 862.8 | 46.9 | 18.3 | 0.6 |
| sanded | 2701.7 | 1.5 | 532.1 | 44.7 | 60.5 | 1.2 | 1574.9 | 0.9 | 1018.9 | 55.2 | 19.7 | 0.7 |
| polished | 2702.2 | 1.3 | 519.6 | 38.6 | 61.1 | 1.0 | 1575.9 | 0.5 | 999.8 | 85.7 | 19.1 | 0.7 |
| plasma | 2703.2 | 1.6 | 470.4 | 41.6 | 60.4 | 1.3 | 1575.7 | 1.0 | 990.2 | 68.7 | 18.9 | 0.5 |

| 20 μm | D' peak location | error | D' Height | error | D' Width | error | D peak location | error | D Height | error | D Width | error |
|---|---|---|---|---|---|---|---|---|---|---|---|---|
| untreated | 1611.4 | 2.4 | 24.0 | 11.0 | 22.5 | 3.8 | 1342.8 | 1.8 | 109.7 | 11.0 | 36.7 | 2.1 |
| sanded | 1616.0 | 2.1 | 50.9 | 12.0 | 8.1 | 3.7 | 1343.4 | 1.0 | 231.2 | 39.5 | 35.1 | 1.4 |
| polished | 1616.9 | 1.5 | 78.1 | 14.4 | 8.6 | 2.1 | 1343.0 | 0.9 | 287.4 | 38.7 | 34.1 | 1.0 |
| plasma | 1615.4 | 1.5 | 54.4 | 6.8 | 7.3 | 2.3 | 1343.2 | 1.1 | 203.3 | 31.8 | 37.5 | 1.4 |

| 11 μm | 2D' peak location | error | 2D' Height | error | 2D' Width | error | D + G peak location | error | D + G Height | error | D + G Width | error |
|---|---|---|---|---|---|---|---|---|---|---|---|---|
| untreated | 3238.0 | 1.7 | 56.1 | 8.0 | 17.7 | 2.0 | 2942.6 | 2.1 | 81.7 | 24.6 | 41.8 | 4.8 |
| sanded | 3238.1 | 2.0 | 63.7 | 8.9 | 17.3 | 1.7 | 2938.9 | 1.9 | 47.9 | 17.0 | 53.7 | 8.7 |
| polished | 3239.6 | 2.2 | 67.9 | 10.3 | 15.2 | 1.3 | 2941.1 | 2.7 | 64.2 | 14.0 | 33.9 | 2.2 |
| plasma | 3238.5 | 1.8 | 60.1 | 8.8 | 13.9 | 1.7 | 2939.4 | 2.0 | 68.1 | 23.9 | 48.3 | 7.3 |

| 11 μm | 2D peak location | error | 2D Height | error | 2D Width | error | G peak location | error | G Height | error | G Width | error |
|---|---|---|---|---|---|---|---|---|---|---|---|---|
| untreated | 2701.3 | 0.6 | 402.6 | 23.8 | 60.21 | 1.9 | 1574.5 | 0.9 | 821.0 | 56.1 | 19.5 | 0.5 |
| sanded | 2701.3 | 0.9 | 444.6 | 31.2 | 58.8 | 1.1 | 1573.6 | 1.2 | 979.8 | 72.0 | 19.2 | 0.5 |
| polished | 2701.4 | 1.3 | 507.4 | 39.6 | 59.9 | 1.0 | 1574.9 | 0.8 | 997.7 | 108.7 | 18.9 | 0.5 |
| plasma | 2701.8 | 1.6 | 414.4 | 30.1 | 61.5 | 1.8 | 1574.3 | 1.6 | 929.2 | 58.3 | 20.0 | 1.0 |

| 11 μm | D' peak location | error | D' Height | error | D' Width | error | D peak location | error | D Height | error | D Width | error |
|---|---|---|---|---|---|---|---|---|---|---|---|---|
| untreated | 1614.2 | 1.6 | 41.4 | 10.2 | 8.3 | 2.4 | 1344.0 | 1.4 | 157.5 | 12.7 | 35.0 | 1.8 |
| sanded | 1614.6 | 1.9 | 44.1 | 4.7 | 5.5 | 2.5 | 1342.3 | 1.8 | 169.0 | 19.2 | 34.3 | 1.5 |
| polished | 1616.9 | 2.4 | 67.5 | 13.6 | 7.2 | 2.8 | 1342.0 | 1.8 | 275.2 | 37.3 | 32.4 | 0.6 |
| plasma | 1613.6 | 2.3 | 61.3 | 17.9 | 11.4 | 3.9 | 1342.7 | 1.5 | 234.7 | 70.2 | 35.1 | 1.4 |

| 400 nm | 2D' peak location | error | 2D' Height | error | 2D' Width | error | D + G peak location | error | D + G Height | error | D + G Width | error |
|---|---|---|---|---|---|---|---|---|---|---|---|---|
| untreated | NA | | NA | | NA | | 2918.5 | 1.7 | 37.3 | 4.4 | 40.8 | 8.6 |
| sanded | NA | | NA | | NA | | 2921.1 | 4.1 | 17.5 | 3.5 | 44.0 | 13.5 |
| polished | NA | | NA | | NA | | 2921.5 | 3.3 | 36.6 | 6.9 | 53.4 | 12.0 |
| plasma | NA | | NA | | NA | | 2919.5 | 2.9 | 38.1 | 6.0 | 44.7 | 7.8 |

| 400 nm | 2D peak location | error | 2D Height | error | 2D Width | error | G peak location | error | G Height | error | G Width | error |
|---|---|---|---|---|---|---|---|---|---|---|---|---|
| untreated | 2670.9 | 1.3 | 413.1 | 21.4 | 70.7 | 3.1 | 1562.0 | 1.0 | 551.0 | 32.3 | 34.8 | 0.8 |
| sanded | 2670.4 | 1.5 | 287.0 | 8.2 | 75.1 | 3.8 | 1561.4 | 0.8 | 468.8 | 11.2 | 35.5 | 0.8 |
| polished | 2670.0 | 0.8 | 425.6 | 17.5 | 68.8 | 1.9 | 1560.8 | 0.8 | 570.6 | 20.1 | 35.3 | 0.7 |
| plasma | 2670.5 | 1.3 | 513.2 | 17.1 | 71.6 | 3.5 | 1561.2 | 0.7 | 635.2 | 27.7 | 34.5 | 0.9 |

| 400 nm | D' peak location | error | D' Height | error | D' Width | error | D peak location | error | D Height | error | D Width | error |
|---|---|---|---|---|---|---|---|---|---|---|---|---|
| untreated | 1598.3 | 1.1 | 47.0 | 8.1 | 17.6 | 2.6 | 1330.1 | 1.1 | 345.1 | 12.6 | 38.7 | 0.5 |
| sanded | 1598.1 | 0.5 | 35.4 | 8.4 | 14.4 | 2.4 | 1330.1 | 1.3 | 295.4 | 9.5 | 40.6 | 1.2 |
| polished | 1598.2 | 0.5 | 35.8 | 9.4 | 14.6 | 3.0 | 1329.3 | 0.8 | 340.5 | 8.7 | 38.0 | 1.1 |
| plasma | 1598.1 | 0.4 | 43.0 | 7.8 | 20.1 | 2.6 | 1330.3 | 1.2 | 370.1 | 16.2 | 39.6 | 0.3 |

Conclusion

The work presented highlights the fabrication of solvent processed thermoplastic electrodes and their resulting electrochemical, physical and Raman characterization. The unique processing method enabled an electrode material which demonstrates both easy fabrication, high conductivity, and excellent electrochemistry. Through judicious selection of the particle type, particle-to-binder ratio, and surface treatment, the electrochemical and physical properties can be varied greatly. The electrode material also adds the ability to create micrometer-sized features using an array of common fabrication methods, including embossing. Of significant importance is that these new low-cost graphite electrodes can realize high electrochemical activity when properly activated, similar to that of more exotic carbons like carbon nanotubes, graphene, or HOPG.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Materials and Methods

Reagents

Poly(methyl methacrylate) (PMMA) was Optix from Plaskolite and was used as the TPE binder and the template material. Carbon sources were synthetic graphite powder (7-11 µm, 99%, Alfa Aesar), acetylene carbon black (100% compressed, STREM Chemicals), synthetic graphite powder (<20 µm, Sigma-Aldrich), and carbon nanopowder (≤500 nm, 99.95% trace metal basis, Sigma-Aldrich). Chemicals were potassium ferricyanide (99%, Sigma-Aldrich), potassium phosphate monobasic (99.8%, Sigma-Aldrich), potassium phosphate dibasic (98%, EMD Chemicals), potassium chloride (99-100.5%, Sigma-Aldrich), hexaammineruthenium(III) chloride (Sigma-Aldrich), ascorbic acid (99%, Sigma-Aldrich), dopamine hydrochloride (Sigma-Aldrich), iron(III) nitrate nonahydrate (Fisher), and 1,2-dichloroethane (Fisher).

Conductivity Measurements

Through-plane resistivity (inverse of conductivity) was measured by a two-point probe (Fluke 187 multimeter, accuracy of 0.01Ω) placed on opposing faces of a TPE cylinder, with typical cylinder dimensions on the order of ~3 mm thick and a diameter of 2-5 mm. Further details on measuring conductivity can be found in the Examples.

Electrochemical Measurements and Surface Treatment

Electrochemistry was performed with a CHI 660 potentiostat, using a saturated calomel electrode (SCE) reference saturated with KCl. The counter electrode was a 1:3 PMMA: carbon TPE plate made using 20 µm particles with an area that exceeded that of the working electrode by at least 10-fold. Potassium ferricyanide solutions were 10 mM, using a 0.5 M KCl solution. Impedance measurements were done at the E1/2 of the ferricyanide redox couple taken from cyclic voltammetry at 100 mV s$^{-1}$; the perturbation voltage was 10 mV, with a frequency range from 100 000 to 0.1 Hz. Dopamine, ascorbic acid, and iron nitrate solutions were made in 0.1 M phosphate buffer at pH 7.4. Hexaammineruthenium(III) chloride experiments were at 1 mM in a 0.5 M KCl solution. The platinum electrode had a diameter of 1.8 mm, TPE electrodes were 5 mm in diameter, glassy carbon was 3 mm in diameter, and the DropSens electrode was 4 mm in diameter. The surface treatments were plasma exposure (after sanding) for 3 min at 35 W in ambient air, wet sanding (firm pressure) with 600 grit paper, and wet polishing with a micro-fiber pad with 0.05 µm alumina for ~1 min with firm pressure.

Capacitance Measurements

The capacitance was measured with cyclic voltammetry using the current response at 0.2 V vs SCE, with a totaled sampled region of −0.1 to 0.5 V vs SCE, and a scan rate of 100 mV s$^{-1}$. Example voltammograms can be found in FIG. 10. Averaged capacitance from cyclic voltammetry was calculated using eq. 1, $$C_{area} = \left( \frac{|I_{anodic}| + |I_{cathodic}|}{(2V)A} \right) \quad \text{(eq. 1)}$$

where $C_{area}$ is the geometric area-normalized capacitance, V is the scan rate (V s$^{-1}$), $I_{anodic}+I_{cathodic}$ is the width of the cyclic voltammogram at 0.2 V vs SCE, and A is the area of the electrode.

Spectroscopy

A JEOL JSM-6500F field emission scanning electron microscope was used at a 15 keV accelerating voltage to capture images. Raman spectroscopy was performed on an Olympus IX-73 optical microscope with an Ondax THz-Raman laser source (5 mW, 532 nm laser with a 1.2 µm spot size). The Raman signal was collected in a backscattering geometry, passed through a Horiba iHR-550 imaging spectrometer, and detected on a Synapse back-illuminated deep depletion charge-coupled device (CCD). Individual spectra were acquired for 60 s across a 1 mm×1 mm sample area. The crystallite domain size was calculated using eq. 2, $$L_a(\text{nm}) = (2.4 \times 10^{-10}) \lambda_1^4 \left( \frac{I_D}{I_G} \right)^{-1} \quad \text{(eq. 2)}$$

where La is the domain size in nm, λl is the wavelength of the laser, and (ID/IG) is the ratio of the peak intensity of the D and G bands.

Example 2. General Experimental Procedures

Electrochemistry was performed with a CHI 660 potentiostat, using a calomel reference saturated with KCl. The counter electrode for three electrode experiments was a specially fabricated PMMA cell with a volume ~1.3 mL, coated with PMMA/graphite, also a block of stainless-steel mesh was laid into the bottom of the cell to provide additional surface area. The counter electrode had nearly ~500× the surface area as the working electrode. Potassium ferricyanide (Sigma) solutions were 10 mM [Fe(CN)$_6$]$^{-3}$ and 10 mM [Fe(CN)$_6$]$^{-4}$, using a 0.1M phosphate buffer solution at pH of 7.1. Ferricyanide impedance measurements were done at the E$^{1/2}$ of the redox couple taken from cyclic voltammetry at 100 mV/s, perturbation voltage was 10 mV, with a frequency range from 100000 Hz to 0.1 Hz.

A thermoplastic (e.g., PMMA) is dissolved using a mixing agent. This may be any solvent (e.g., dichloroethane), or combination of solvents, capable of thoroughly dissolving the plastic. In some embodiments of the invention, it is desirable to choose solvents based partially on the vapor pressure of the solvent in order to control or slow the rate of evaporation in order to create a more homogeneous material when dried. Typically, lower vapor pressure and/or high boiling point solvents will be preferable in these cases.

A carbon allotrope (e.g., graphite) is added to the solution in the amount needed to achieve the desired ratio. Typical carbon:plastic ratios will be 1:1 or greater (2:1, 3:1, 4:1, 5:1, 6:1, etc.), although in some cases ratios may be less than one (e.g., 0.5:1, 0.3:1). The carbon/plastic/solvent mixture is thoroughly mixed.

The mixture is then applied to the desired substrate, possibly in multiple coats or with multiple methods. Application of the mixture may be accomplished via any suitable method, including by brushing, hand-pressing, drop-coating, spin-coating, solution casting, inkjet printing, 3D printing, spraying, doctor blading, screen printing. For some of these methods (such as 3D printing), it may be preferable to control or increase the viscosity of the mixture prior to applying to the substrate. For example, partially or completely drying the mixture is one method that may be used to increase the viscosity.

The deposited mixture is allowed to thoroughly dry and may be optionally hot pressed. Drying may be performed by any of a variety of means known in the art, including by leaving in atmosphere and/or by placing the material in an oven at elevated temperature. Hot pressing may be performed as is commonly known in the art. Suitable pressure may vary by application and is commonly in the range from about 1 psi to several 1000 s of psi. For the subject invention, a typical working pressure range is commonly between a couple hundred psi and about two or three thousand psi. The temperature of hot pressing may vary by application. In certain embodiments of the invention, the temperature of hot pressing may be approximately near (including slightly above and slightly below) the glass transition temperature (Tg) of the plastic in the mixture. In some embodiments, a template and partially dried thermoplastic mixture (e.g., the forming thermoplastic composite) is held between a gasket and two rigid plates with applied pressure while the composite material hardens.

In other embodiments of the invention, the dried electrode material may then be heated near the $T_g$ of the supporting plastic and molded into complex shapes, channels, or patterns, including pillar arrays, interdigitated, or 3-dimensional electrodes.

Optionally, a surface treatment may be performed. Possible treatments include sanding, polishing, plasma treatment, sonicating, electrochemical conditioning, solvent wiping, and chemical modification. In some embodiments, such treatments improve the performance of the electrode (e.g., such as by improving the electrochemical activity, by exposing more active area of the electrode, by decreasing the charge transfer resistance, etc.).

Electrode Fabrication

PMMA sheets and a solvent were premixed typically in a ratio of 2 mL solvent to 1 gram of PMMA, and kept for a period of months as stock solutions. The solutions had a consistency of medium viscosity oil. The consistency can be tuned by adding or removing solvent. Dichloromethane and chloroform were found to be the most aggressive solvents for dissolving PMMA, acetone, ethyl acetate, dichloroethane were also effective solvents.

Carbon was added to the stock PMMA/solvent solutions in the desired ratio, care was taken to account for any solvent evaporation in storage by drying a known mass of the stock solution before use. The carbon/PMMA/solvent mixture was mixed by hand, then vigorously vortex mixed for ~3 minutes, typically in a 20 mL scintillator vial. The resulting mixtures were kept as stock solutions and were seemingly indefinitely stable. The solvent/PMMA/carbon mixtures could be painted onto surfaces, partially dried to a gum like consistency, or poured or pressed into molds and left to dry.

Figure 16:
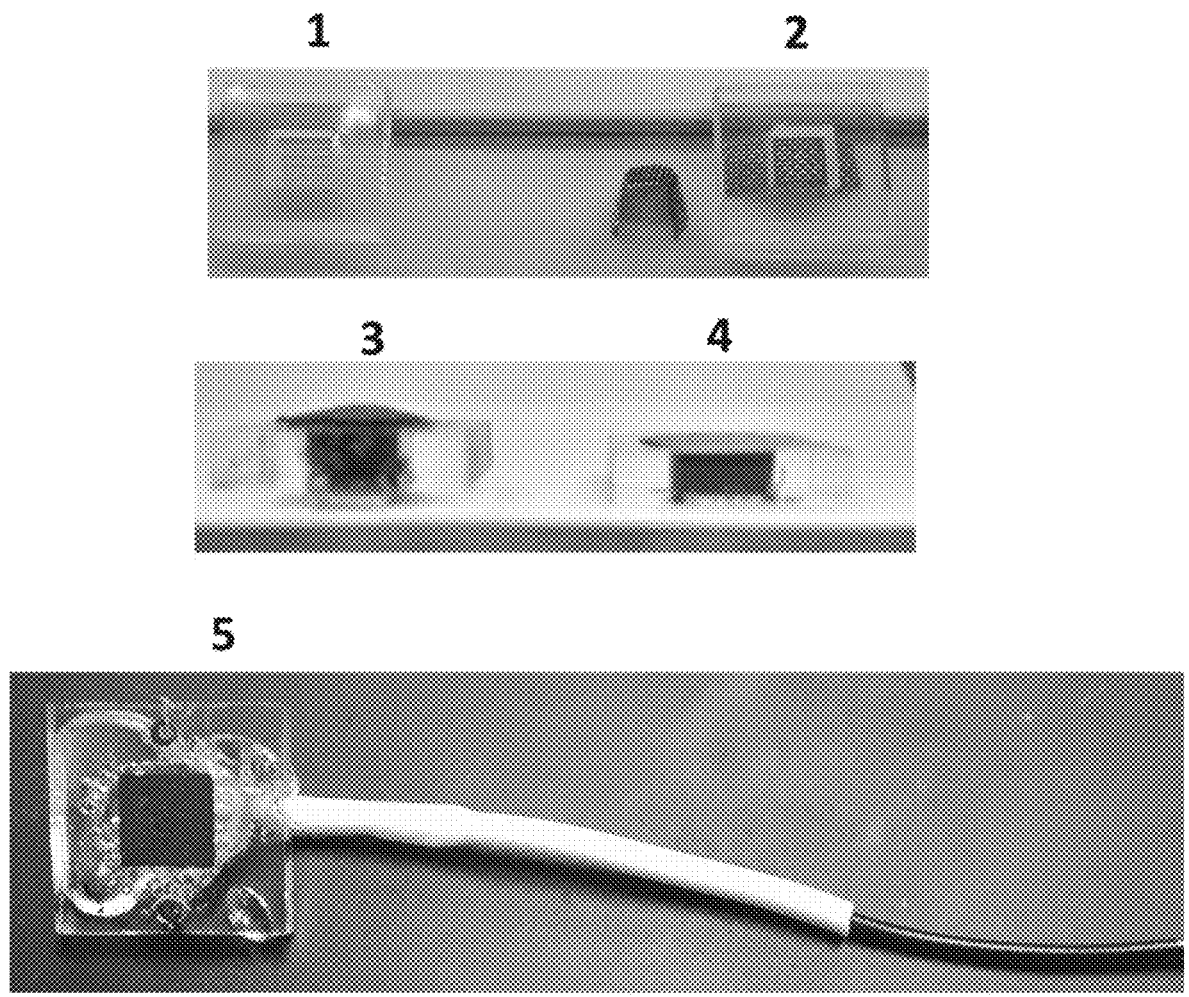
FIG. 16. Schematic (steps 1-5) for fabrication of PMMA carbon composite electrodes. Electrode on the left, step 5, shows a highly pitted "worst case" post sanded electrode. Pitted electrodes are common without the proper pressure applied in conjunction with a gasket, to compress the material as it is drying.
Figure 17:
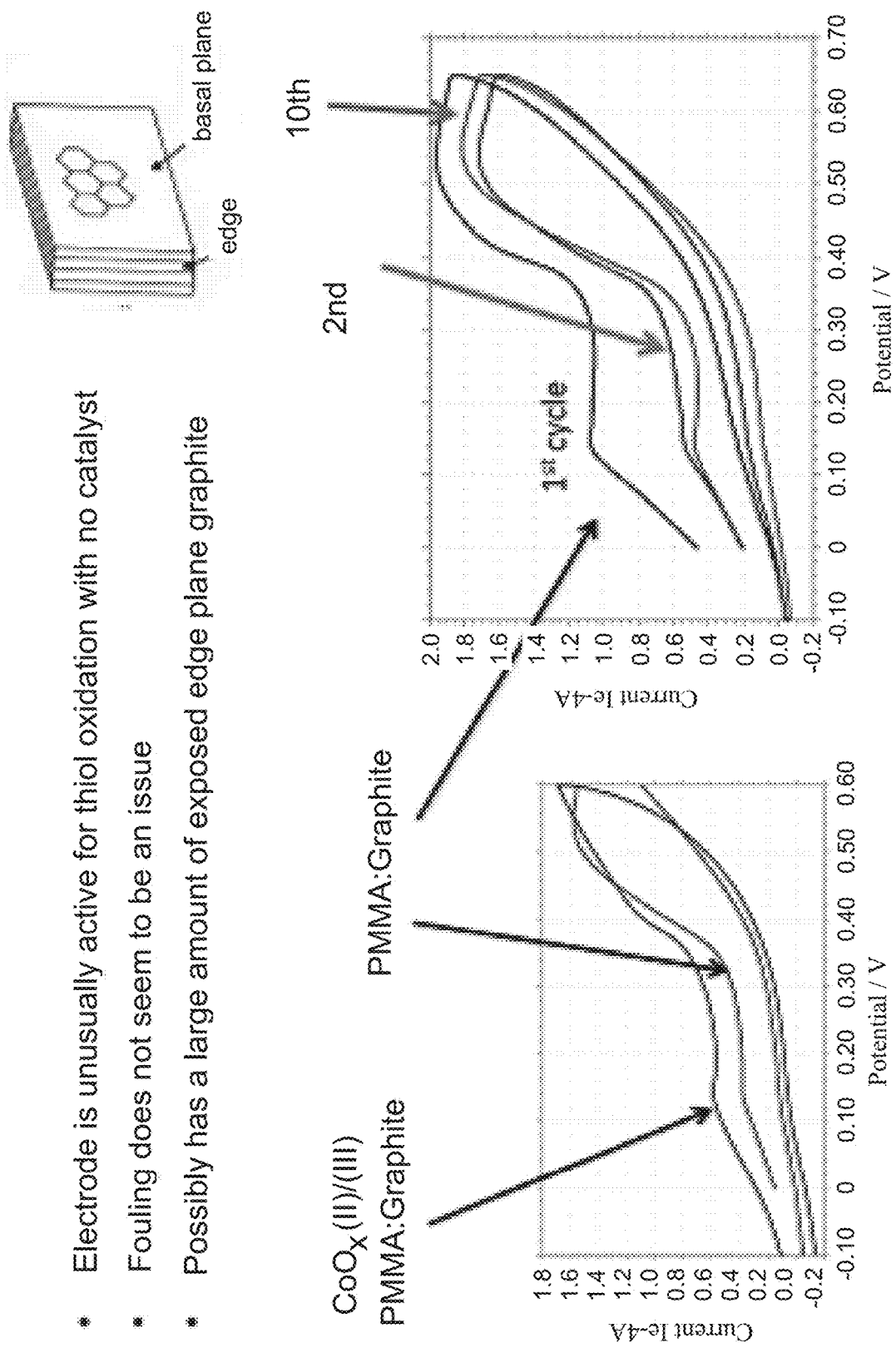
FIG. 17. (left) a PMMA graphite electrode modified with cobalt oxide and unmodified electrode for the detection of 5 mM dithiothreitol in phosphate buffer pH 7. (right) a PMMA and graphite electrode subjected to repeated cycling in 5 mM dithiothreitol in phosphate buffer pH 7.
Figure 18:
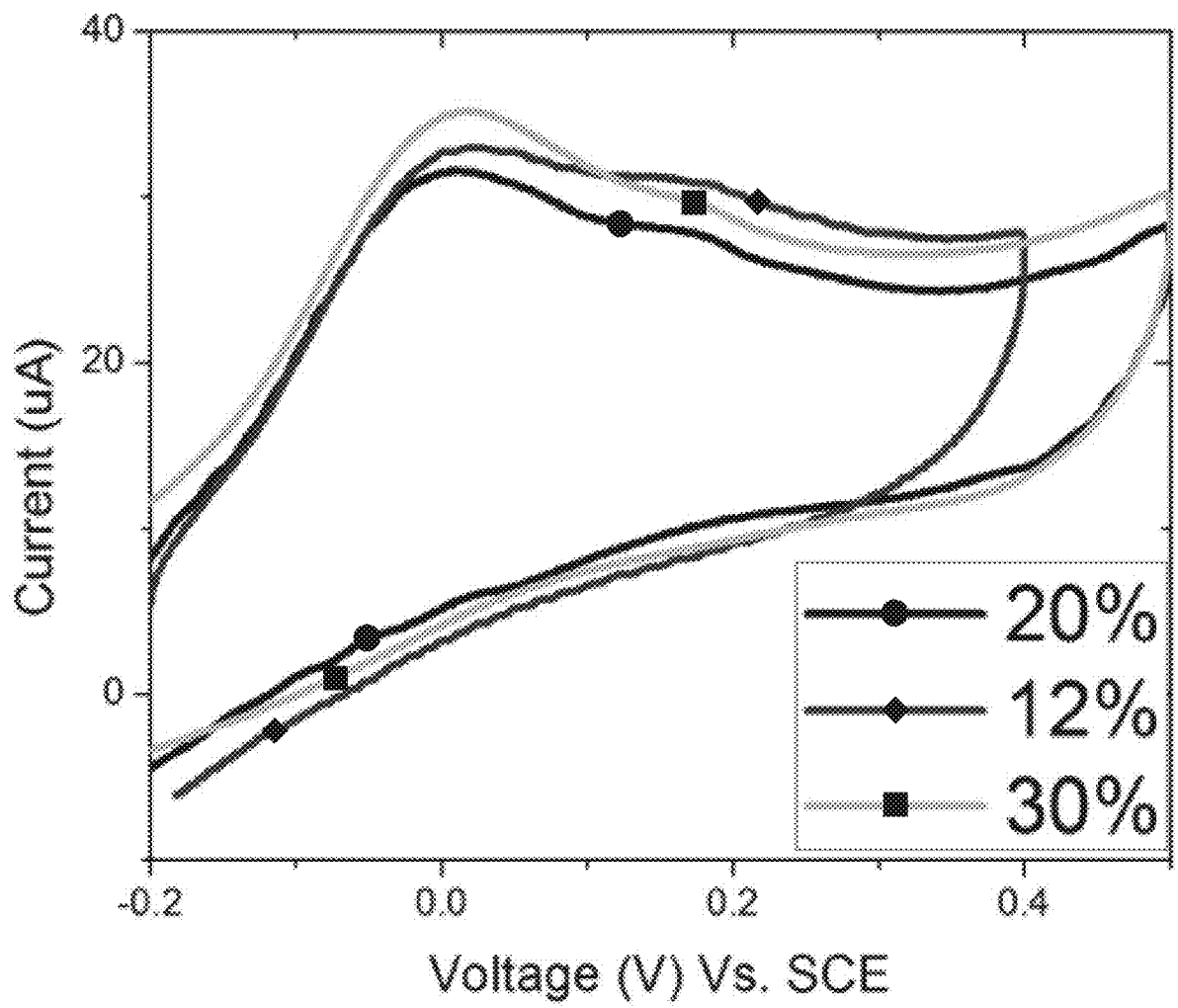
FIG. 18. Graph of current versus voltage for a PMMA: graphite electrode modified with various weight percentages of cobalt phthalocyanine (catalyst:carbon) for the detection of dithiothreitol in phosphate buffer pH 7

Electrodes were fabricated according to the process in FIG. 16. A $CO_2$ laser (Epilog) was used to cut and etch the PMMA electrode template. Laser settings of 30% speed and 95% power in vector mode were used to cut the ⅛ inch thick PMMA. Raster settings varied by desired etch depth, typical settings were 10% speed, 90% power, DPI 1000, which would give a ~0.7 mm etched depth.

Step 1 and Step 2 from FIG. 16 involves cutting, etching, and inserting the metallic contact into the PMMA template. The steps can be done in less than 1 minute. Step 3 involves painting on a thin layer of PMMA/graphite/solvent onto the substrate cavity as an adhesion layer, then firmly hand pressing a portion of PMMA/graphite/solvent that has a gum like consistency into the form. The electrode is then dried in atmosphere for ~4-5 hours and then placed in an oven (70 Celsius) for ~2 hours to remove the solvent. Depending on the type of solvent and thickness of the electrode more or less drying time may be needed. In Step 4 of the process the electrode is placed in a press and the excess PMMA/graphite is compacted into the cavity and air pockets in the PMMA/graphite solid matrix are largely or completely removed. Pressure used was ~1500 PSI, and the temperature of the press plates was 105 Celsius. The pressure should be added slowly, however, the whole compression process can be done in less than 5 minutes. Step 5 requires sanding the crude electrode with a rough grit sandpaper (~350), then a finer grit (~600), followed by a firm vigorous polish with 0.05 μm alumina for ~2-3 minutes. Thorough polishing was found necessary to achieve the best voltammetry. If the electrode is pitted or has pin holes like the one in FIG. 16 (left), a thin layer of PMMA/graphite/solvent mix can be applied to the surface, dried, and step 5 is repeated. Electrodes with a mirror like, pinhole free, homogenous surface are readily fabricated with this method (FIG. 16, right).

Example 3. Thermoplastic Solution Preparation

Small centimeter sized PMMA pieces (Optix, Plaskolite) were massed and placed in a vial, then mixed with dichloroethane typically in a ratio of ~5 mL solvent to 1 gram of PMMA, and kept for a period of months as stock solutions. When using dichloroethane, the small pieces of PMMA dissolved in about 24 hours. Dichloroethane and chloroform were found to be aggressive solvents for dissolving PMMA, and acetone, ethyl acetate, and DMF were also effective solvents. Toluene, xylenes, and propylene carbonate (PC) could dissolve the PMMA, however, the process took longer than a week to fully dissolve. Once fully dissolved, carbon was added, and the solvent level was adjusted to achieve a uniform mixture. A consistency of viscous oil was found to be desirable for the solvent/PMMA/carbon mixtures. Before use, the mixture was vortex mixed for ~3 min, in a 20 mL scintillator vial. If the mixture was too viscous, efficient mixing did not occur. Sonication was not used in order to avoid altering the chemical structure of the particles or the binder. The resulting mixtures were kept as stock solutions and were seemingly indefinitely stable, and only required remixing by vortex before use.

Example 4. Thermoplastic Electrode Templating

To create patterned (templated) electrodes, the oil-like solvent/PMMA/carbon mixture was poured onto silicon wafers, which served as an inert non-stick surface. The solvent loaded electrode mixture was constantly worked with a small wooden stick on the wafer to facilitate solvent evaporation while in a fume hood. Once the material could be formed into a ball of stiff chewing gum-like consistency, then it was firmly pressed into the PMMA template. A CO$_2$ laser (Epilog Zing) was used to cut and/or etch PMMA electrode templates from stock PMMA sheets (6 or 3 mm thick). The electrode was then placed into a heat press consisting of two brass plates, a piece of PDMS (e.g., a pliable gasket) was placed on one side of the electrode. A temperature of ~60° C. with a pressure of ~50 psi was used. If the TPE mixture was too full of solvent, or too high of a temperature or pressure is used, the finished electrode may be deformed, or the template may be disfigured. In most cases the electrode was left overnight under pressure and heat. The dried electrode was then sanded with 200 or 300 grit sandpaper to remove the excess TPE material, then finished with 600 grit sandpaper for a smoother surface. The electrode and the template can be further smoothed by following sanding by polishing with alumina, or a finer grit sandpaper, such as about 1000 grit to about 3000 grit sandpaper. To finish the electrode, a metallic wire was attached to one side of the TPE using a small amount of silver paint and then covered with two-part epoxy. The entire process is shown schematically in FIG. 1A.

Example 5. Conductivity Measurements and Calculations

Resistivity (inverse of conductivity) was measured by a two-point probe (Fluke 187 multimeter, accuracy of 0.01Ω) placed on two opposing faces of a TPE cylinder which was made with a PMMA mold. The faces of the cylinder were coated with a thin layer of silver paint to compensate for contact resistance. Typical diameters were 3 to 5 mm. In the cases of very low resistivity, longer cylinder lengths and smaller diameters can be used. The dimensions of the cylinder were adjusted to try to keep measured resistances above 1Ω to minimize error. It was important to subtract background resistance inherent with a metal to metal contact, which was variable but typically around 0.3Ω. The background was measured by shorting the silver coated copper pads of the multimeter, which mimicked the silver-silver contact in TPE conductivity measurements. Eq. 3 describes conductivity and resistivity, where p is resistivity, R (Ω) is resistance, D is diameter of disk, L is length, and σ (S/m) is conductivity.

$$\rho = R * \frac{\pi (0.5D)^2}{L} \text{ and } \sigma = 1/\rho \quad \text{(eq. 3)}$$

Irreversible Peak Current Calculation

In eq. 4, $I_P$ is the peak current, n is the number of electrons, α electron transfer coefficient, A is area, C is concentration, D diffusion coefficient, v is the scan rate. The electron transfer coefficient used here was 0.5, and the ascorbic acid diffusion coefficient was 6.5E$^{-6}$ cm/s$^2$.

$$I_p = 0.01 \times 10^5 n[(1-\alpha)n_a]^{1/2} ACD^{1/2} v^{1/2} \quad \text{(eq. 4)}$$

Reversible Peak Current Calculation

Eq. 5 is a simplified version of the Randles-Sevcik equation assuming a temperature of 25° C. Where $I_P$ is the peak current, n is the number of electrons, A area, C concentration, D diffusion coefficient, v is the scan rate. Dopamine coefficient of 4.15E$^{-6}$ cm/s taken from previous literature (Wang et al., *Anal. Sci.* 2002, 18, 635) ferricyanide 6.67E$^{-6}$ cm/s, and hexaamineruthenium(III) chloride 7.9E$^6$ cm/s.

$$I_p = 2.69 \times 10^5 n^{3/2} ACT^{1/2} v^{1/2} \quad \text{(eq. 5)}$$

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A thermoplastic electrode comprising:
   a) a thermoplastic composite having a uniform dispersion of a poly(methyl methacrylate) binder, and a carbon allotrope that has a particle diameter of about 0.1 μm to about 300 μm, wherein a mass ratio of binder:allotrope is about 1:0.5 to about 1:6, and wherein the thermoplastic composite has surface roughness of less than 5 μm; and
   b) a substrate comprising an electrical conductor that is in electrical contact with the thermoplastic composite;
   wherein the carbon allotrope is at least partially exposed at an active surface of the thermoplastic electrode, and the thermoplastic electrode has a pattern diameter or width of about 0.1 μm to about 500 μm and a conductivity of about 10-fold to about 1000-fold higher than a screen-printed carbon electrode.

2. The thermoplastic electrode of claim 1 wherein the carbon allotrope comprises graphite, graphene, carbon nanotubes, or carbon black.

3. The thermoplastic electrode of claim 2 wherein the graphite has a particle size of about 0.5 μm to about 30 μm.

4. The thermoplastic electrode of claim 3 wherein the mass ratio of binder:graphite is about 1:2 to about 1:3.

5. The thermoplastic electrode of claim 4 wherein the conductivity is about 100 S m$^{-1}$ to about 2000 S m$^{-1}$.

6. The thermoplastic electrode of claim 4 wherein the surface roughness is about 0.1 μm to about 2 μm.

7. The thermoplastic electrode of claim 1 consisting essentially of:
   a) a non-metal thermoplastic composite having a uniform dispersion of poly(methyl methacrylate) binder, and graphite that has a particle diameter of about 0.1 μm to about 50 μm, wherein a mass ratio of binder:graphite is about 1:0.5 to about 1:3, and wherein the non-metal thermoplastic composite has surface roughness of less than 5 μm; and
   b) a substrate comprising an electrical conductor that is in electrical contact with the non-metal thermoplastic composite;
   wherein the graphite is at least partially exposed at an active surface of the non-metal thermoplastic electrode, and the non-metal thermoplastic electrode has a pattern diameter or width of about 0.1 μm to about 500 μm and a conductivity of about 10-fold to about 1000-fold higher than a screen-printed carbon electrode.

* * * * *